United States Patent
Ohtani et al.

(10) Patent No.: US 7,519,300 B2
(45) Date of Patent: Apr. 14, 2009

(54) OPTICAL OUTPUT CONTROL METHOD FOR USE IN OPTICAL TRANSMISSION NODE AND OPTICAL OUTPUT CONTROL APPARATUS FOR USE IN THE SAME

(75) Inventors: Toshihiro Ohtani, Yokohama (JP); Masaki Sato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 816 days.

(21) Appl. No.: 10/861,568

(22) Filed: Jun. 7, 2004

(65) Prior Publication Data

US 2005/0185957 A1 Aug. 25, 2005

(30) Foreign Application Priority Data

Feb. 24, 2004 (JP) ............................. 2004-047680

(51) Int. Cl.
*H04B 10/02* (2006.01)
(52) U.S. Cl. .................. 398/177; 398/6; 398/15; 398/18
(58) Field of Classification Search .............. 398/6, 398/11, 18, 37, 177, 181, 15
See application file for complete search history.

(56) References Cited

U.S. PATENT DOCUMENTS

| | | | |
|---|---|---|---|
| 6,583,899 B1 * | 6/2003 | Casanova et al. | 398/9 |
| 2002/0024690 A1 * | 2/2002 | Iwaki et al. | 359/110 |
| 2002/0114060 A1 | 8/2002 | Kobayashi et al. | 359/334 |
| 2003/0002145 A1 | 1/2003 | Chitani | 359/341.43 |
| 2003/0234973 A1 | 12/2003 | Yamaguchi et al. | 359/334 |

FOREIGN PATENT DOCUMENTS

| | | |
|---|---|---|
| JP | 3-235536 | 10/1991 |
| JP | 5-344068 | 12/1993 |
| JP | 6-177837 | 6/1994 |
| JP | 8-265257 | 10/1996 |
| JP | 9-181384 | 7/1997 |
| JP | 2000-332695 | 11/2000 |
| JP | 2001-77731 | 3/2001 |
| JP | 2002-77056 | 3/2002 |
| JP | 2002-252595 | 9/2002 |
| JP | 20023-8518 | 1/2003 |
| JP | 2003-298527 | 10/2003 |

OTHER PUBLICATIONS

Japanese Patent Office Notice of Grounds of Rejection for corresponding Japanese Patent Application No. 2004-047680, mailed Jul. 1, 2008.

* cited by examiner

*Primary Examiner*—Christina Y Leung
(74) *Attorney, Agent, or Firm*—Staas & Halsey LLP

(57) ABSTRACT

In an optical transmission node network in which a first optical transmission node is connected with a second optical transmission nodes through an optical fiber cable and automatic optical output (APSD: Automatic Power Shut-Down) control is activated, after the APSD control is brought into an inhibited status, if an optical conduction to the second optical transmission node is detected, the APSD control inhibited status is canceled. In this way, if an optical transmission fiber is resorted (reconnected) after optical output power measurement or the like is carried out, the APSD control inhibition status (invalid status) is canceled for automatically restoring the APSD control activated status. Thus, optical output can be prevented from being inadvertently emitted at a high energy level from the optical fiber cable.

38 Claims, 13 Drawing Sheets

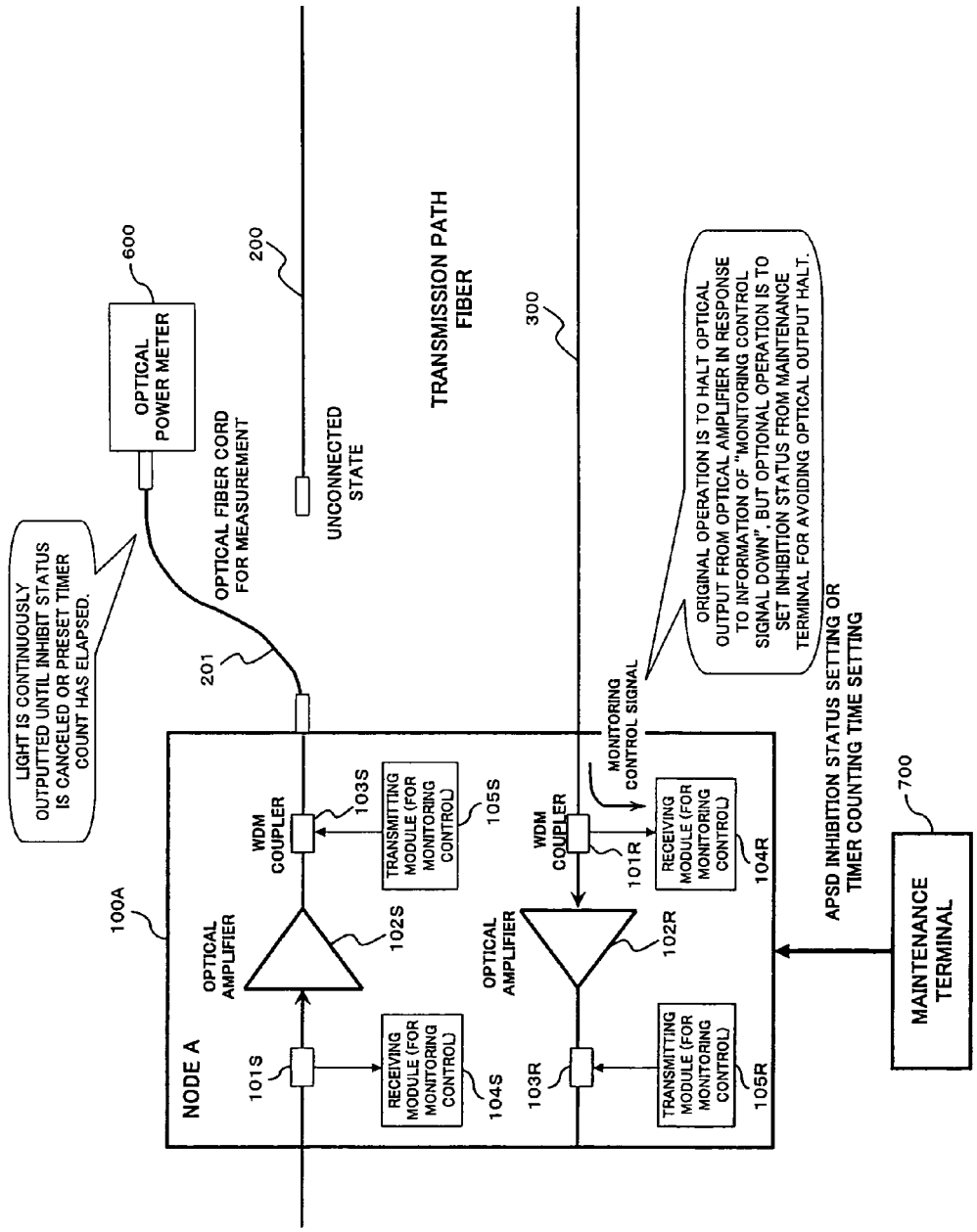

OPTICAL OUTPUT CONTROL METHOD FOR USE IN OPTICAL TRANSMISSION NODE AND OPTICAL OUTPUT CONTROL APPARATUS FOR USE IN THE SAME

BACKGROUND OF THE INVENTION (1) Field of the Invention

The present invention relates to an optical output control method for use in an optical transmission node and an optical output control apparatus for use in the same. In more particularly, the present invention relates to a technology suitable for use in an optical transmission node with an automatic optical output control (APSD: Automatic Power Shut-Down) function which controls, in response to a reception of optical path cut (light down) detecting information from another optical transmission node, the optical output therefrom to decrease or halt.

(2) Description of Related Art

FIG. 10 is a block diagram showing one example of a conventional WDM (Wavelength Division Multiplex) optical transmission system. As shown in FIG. 10, the WDM optical transmission system comprises an optical transmission station (optical transmission node) 100A (station A) and an optical transmission station (optical transmission node) 100B (station B) connected to each other through a pair of (couple of) optical transmission paths (fiber cables) so that bidirectional communication can be executed. In the system shown in FIG. 10, the optical transmission node 100B (station B) is also connected to another neighboring optical transmission node (optical node or a terminal equipment: station C) so that bidirectional communication can be executed between the stations.

In order to attain the bidirectional communication between the optical transmission nodes (hereinafter referred to as simply "node" or "station") 100A and 100B, the nodes have a symmetrical arrangement. That is, each of the nodes has both of a transmission system and a reception system. The transmission system comprises WDM couplers 101S and 103S, an optical amplifier 102S, a receiving module 104S and transmission module 105S for monitoring control, and the reception system comprises WDM couplers 101R and 103R, an optical amplifier 102R, a receiving module 104R and transmission module 105R for monitoring control.

In the transmission system, the WDM coupler 101S is a unit for extracting a monitoring control signal as an OSC (Optical Service Channel) contained in a received WDM signal light and supplying the monitoring control signal to the receiving module 104S. The optical amplifier 102S is a unit for amplifying the optical output power to a necessary level which enables the received WDM signal light supplied from the WDM coupler 101S to be sent to the node B (or 100A) in the subsequent stage depending on the transmission distance between the source to the destination. This amplification is performed in a manner that the wavelengths are collectively set to the same wavelength. The WDM coupler 103S is a unit for coupling the OSC light (monitoring control signal) from the transmission module 105S and the WDM signal light after undergoing amplification in the optical amplifier 102S to each other and outputting the resultant signal to the optical transmission path 200 (or 300).

The receiving module 104S is a unit for receiving an OSC light transmitted from the WDM coupler 101S and performing control in accordance with the monitoring control signal (APSD control or the like which will be described later on). The receiving module 105S is a unit for generating information to be notified for the next node (station located on the upstream side) 100B (or 100A) as the monitoring control signal.

Conversely, in the receiving system, the WDM coupler 101R is a unit for branching the OSC signal (monitoring control signal) contained in the received WDM signal supplied from the optical transmission path 300 or 200 to the receiving module 104R. The optical amplifier 102R is a unit for amplifying the optical output power to a necessary level which enables the received WDM signal light supplied from the WDM coupler 101R to reach the node in the subsequent stage depending on the transmission distance between the source to the destination. This amplification is performed in such a manner that the wavelengths are collectively set to the same wavelength. The WDM coupler 103R is a unit for coupling the OSC light (monitoring control signal) from the transmission nodule 105R and the WDM signal light after undergoing amplification in the optical amplifier 102R to each other.

The receiving module 104R is a unit for receiving the OSC light (monitoring control signal) transmitted from the WDM coupler 101R and performing control in accordance with the monitoring control signal (APSD control or the like). The transmitting module 105R is a unit for generating information to be notified for the next node (station located on the upstream side) as the monitoring control signal.

Each of the above optical amplifiers 102S and 102R is generally arranged as an optical fiber amplifier doped with rare-earth elements such as those of EDFA (Erbium Doped Fiber Amplifier). To this end, a Raman amplifier can be utilized together with the above optical amplifiers 102S and 102R.

In the WDM optical transmission system arranged as described above, the WDM signal (main signal light) is transmitted through the optical transmission paths 200 and 300 while relayed and amplified by the amplifiers 102S and 102R of the respective nodes 100A and 100B. Also, the monitoring control light (a signal having a lower transmission rate than that of the main signal light) is transmitted as the OSC signal or the like. The stations 100A and 100B, which can be located on the downstream side relative to the other, can detect an abnormal state brought about in the transmission path or the status of the upstream side by monitoring the monitoring control signal. Also, the stations 100A and 100B can notify the above-described information (monitoring information) to the station located on the upstream side thereof by using the opposing optical transmission path 300 or 200. For example, the node 100B can add information of the node 100B to information sent from a station C located on the downstream side and sends the resultant information to the station 100A on the upstream side.

In the case of the optical transmission nodes 100A and 100B where they are distant from each other or they perform the WDM transmission, the transmission is inevitably performed at a large transmission power. For this reason, in order for taking the security of a maintenance engineer or the like of the apparatus into consideration, a light beam emission at a high transmission power shall be prevented from being inadvertently brought about upon fiber pull-out, fiber cut or the like. To this end, as is disclosed in the following listed Patent Documents 1 to 3, a function is ordinarily provided so that the optical output is lowered or shutdown when the optical output is opened at the end of the fibers 200 or 300 to the space.

As for example shown in FIG. 11, if some accidents are brought about such that a fiber is cut at an output port of a station on the upstream side, an optical transmission path is cut, a fiber connection (connector) is inadvertently disconnected (step A1), and the receiving module 104R in the station 100B on the downstream side becomes unable to receive the monitoring control signal (step A2), this information is transmitted to the transmitting module 105S of the station on the opposite side (step A3). Then, the transmitting module 105S notifies the station 100A on the upstream side (receiving module 104R) of information that the station 100B on the downstream side 100B detects monitoring control signal down through the transmission path 300 on the opposing side by means of the monitoring control signal (step A4).

In this way, the receiving module 104R of the station 100A on the upstream side recognizes that the station 100B on the downstream side detects the monitoring control signal down (step A5). Then, the station 100A on the upstream side takes some countermeasure such as halting control on the optical amplifier 102S for the opposite side and the optical output to the optical transmission path 200 is shutdown (step A6). The control performed in the above-manner is known as an APSD control.

The APSD control may be performed not only for detection on the monitoring control signal down but also for detection on the main signal down. For example, if main signal light down is brought about in the input path to the optical amplifier 102R, information indicative of this incident is supplied to the station 100A on the upstream side by means of the monitoring control signal, and the optical output to the optical transmission path 200 of the station 100A on the upstream side is shutdown (see reference numerals 400 and 500 in FIG. 11). The above shutdown control is performed in response to a trigger which is made by detection of fresnel reflection at a portion where the connector is disconnected (e.g., see paragraph number 0009 of the following Patent Document 3). The following Patent Document 4 discloses a technology concerning reflected light detection, for example.

Further, if the arrangement of the two stations is one in which bidirectional transmission is performed between the two stations, in order to avoid control disabled status when double failure is brought about (i.e., the light down is brought about at transmission paths in the both directions), ordinary optical output decreasing control on the self node is performed in the upstream-side station but also in the downstream-side station in which the monitoring control signal down is detected (e.g., see paragraph number 0037 of the following Patent Document 2).

As for example shown in FIG. 12, it is assumed that some accidents such as connector disconnection and fiber cut are brought about in the optical transmission path 300 which is one of the transmission paths (step B1). Under this state, if some accidents such as connector disconnection and fiber cut are also brought about in the optical transmission path 200 which is the other of the transmission paths, there is no means for notifying the station 100A of the monitoring control signal down information, which might be detected by the station 100B if connection of the optical transmission path 200 is maintained. Therefore, it becomes impossible to effect the optical output control for decreasing the optical output from the station 100A.

For this reason, if the station 100A (the receiving module 104R) detects that it becomes incapable to receive the monitoring control signal from the station 100B (step B2), the station 100A takes some countermeasures such as halting control on the optical amplifier 102S for the opposite side so that the optical output from the station 100A itself is decreased (step B3).

The above-described APSD control is necessary for securing safety in the maintenance environment. However, if an output fiber is opened to the space upon set-up confirmation of the apparatus or a trouble management for the apparatus, the station on the downstream side will detect the monitoring control signal down. As a consequence, the optical output will be automatically decreased owing to the APSD control, with the result that it becomes unable to perform power measurement or the like.

As for example schematically shown in FIG. 13, when the station 100A is connected at an optical output terminal thereof with an optical power meter 600 through an optical fiber cord 201 for measuring the optical output power of the station 100A, the optical transmission fiber 200 is brought into an open state. Thus, the station 100B detects the monitoring control signal down, and information indicative of the monitoring control signal down is transmitted to the receiving module 104R by way of the optical transmission path 300. Therefore, the station 100A halts the optical output thereof owing to the APSD control and with the result that it becomes unable to perform power measurement.

For this reason, in general, the stations 100A and 100B are arranged to respond to an APSD inhibition (invalid) setting made from a maintenance terminal 700 or the like so that the APSD control can be forcibly brought into the inhibition status. In this case, if restoration is made from the inhibition status (APSD activating setting), the fundamental process is to make a restoration setting from the maintenance terminal 700. However, in order to avoid accidents such that the maintenance engineer forgets restoration setting or that the inhibition status setting is permanently left activated after the in-service mode (after starting the ordinary management mode), a timer is cooperatively operated for counting a time period of several minutes (i.e., the inhibition status setting validity time is set) for ensuring the automatic restoration from the inhibition status setting. The aforesaid inhibition status setting validity time is often set to several minutes on the basis of default, but this setting may be changed to several ten minutes or the like in accordance with a command inputted through the maintenance terminal 700.

Patent Document 1: Japanese Patent Application Laid-open No. 2001-77731
Patent Document 2: Japanese Patent Application Laid-open No. 2002-252595
Patent Document 3: Japanese Patent Application Laid-open No. 2003-8518
Patent Document 4: Japanese Patent Application Laid-open No. 2003-298527

However, even if the APSD control is arranged to restore automatically within a period of time of several minutes counted by the time as described above, this APSD control arrangement cannot always handle all possible accidental cases. That is, if the timer setting (inhibition status setting validity time) is set to a long period of time or other conditions are taken place and an engineer under the measurement duty at first leaves from the measurement work place or the engineer under the measurement duty is replaced with other person, the replacing person can unintentionally pull out the optical fiber cord 201 for the measurement in innocence of that the APSD control is canceled. In such a case, there is a fear that an optical output with a high power can be outputted.

The present invention is made in view of the above aspect. Therefore, it is an object of the present invention to propose a method in which even if the setting time for restoration is still not counted by the restoration timer, when the transmission path fiber is restored to its original state (reconnected) after the optical output power measurement or the like, the APSD canceling state is automatically restored to the ordinary state so that the optical output can be prevented from being outputted inadvertently from the fiber at a high power.

SUMMARY OF THE INVENTION

According to the present invention, in order to attain the above object, there is proposed an optical output control method for use in an optical transmission node (hereinafter called "a first node"), which exchanges light with a different optical transmission node (hereinafter called "a second node"), the first node performing automatic optical output control to decrease or shutdown an optical output therefrom to the second node upon receiving light down detecting information sent from the second node, the automatic optical output control being selectively activated or inhibited, the method including the steps of detecting an optical path connection established between the first and second nodes while the automatic optical output control is being inhibited, and canceling such inhibition status of the automatic optical output control, if the optical path connection is detected, to activate the automatic optical output control.

In this case, the light may include main signal light and monitoring control light.

Further, according to the present invention, there is provided an optical output control apparatus for use in an optical transmission node (hereinafter called "a first node"), which exchanges light with a different optical transmission node (hereinafter called "a second node"), the first node selectively performing automatic optical output control to decrease or shutdown an optical output therefrom to the second node upon receiving light down detecting information sent from the second node, whereby the automatic optical output control being selectively activated or inhibited, the optical output control apparatus including optical path conduction detecting means for detecting the optical path conduction established between the first and second nodes while the automatic optical output control is being inhibited, and control means for canceling such inhibition status of the automatic optical output control, if the optical path conduction detecting means detects the optical path conduction.

Also in this case, the light may include main signal light and monitoring control light.

In this case, the optical path conduction detecting means may include a light down restoration information detecting unit for detecting light down restoration information sent from the second node, and the control means may include an light down restoration trigger canceling unit for canceling the inhibition status when the optical path cut restoration information detecting unit detects the light down restoration information.

Further, the optical path conduction detecting means may include a reflected light monitoring unit for monitoring reflected light amount of an optical output which is reflected from an output port of the first node, and the control means may include a reflected light amount variation trigger canceling unit for canceling the inhibition status when the reflected light monitoring unit detects decrease of the reflected light amount.

Furthermore, the light down restoration information detecting unit may be arranged as a monitoring control light restoration information detecting unit for detecting light down restoration information, of the monitoring control light, sent from the second node.

According to the present invention, if optical output power measurement or the like is requested for the optical transmission node and the automatic optical output control inhibition status is set to the optical transmission node, and thereafter the optical transmission path (transmission path fiber) restores its original status (i.e., the fiber is reconnected to the node), the automatic optical output control inhibition status is automatically canceled. Therefore, even if the transmission fiber is thereafter pulled out from the node, the automatic optical output control will be activated and light can be prevented from being inadvertently released from the fiber at a high power level. Accordingly, security environment for a worker such as a maintenance engineer can be remarkably improved.

BRIEF DESCRIPTION OF THE DRAWINGS

FIG. 13 is a block diagram for explaining a problem to be overcome in the conventional APSD control.

DESCRIPTION OF THE PREFERRED EMBODIMENTS

[A] Description of First Embodiment

APSD Inhibit Automatic Cancellation

Figure 1:
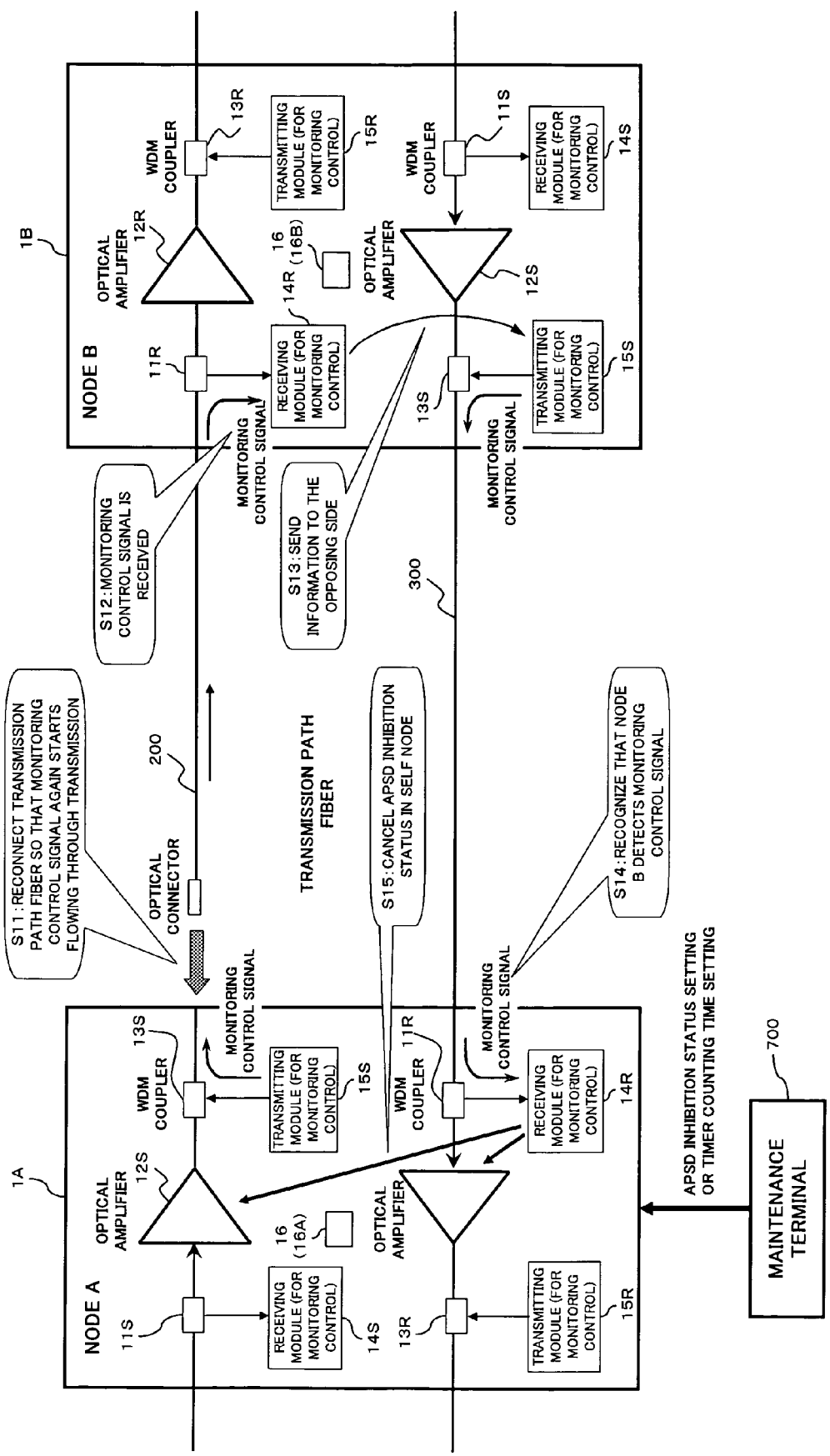
FIG. 1 is a block diagram showing an arrangement of a WDM optical transmission system as a first embodiment of the present invention.
Figure 10:
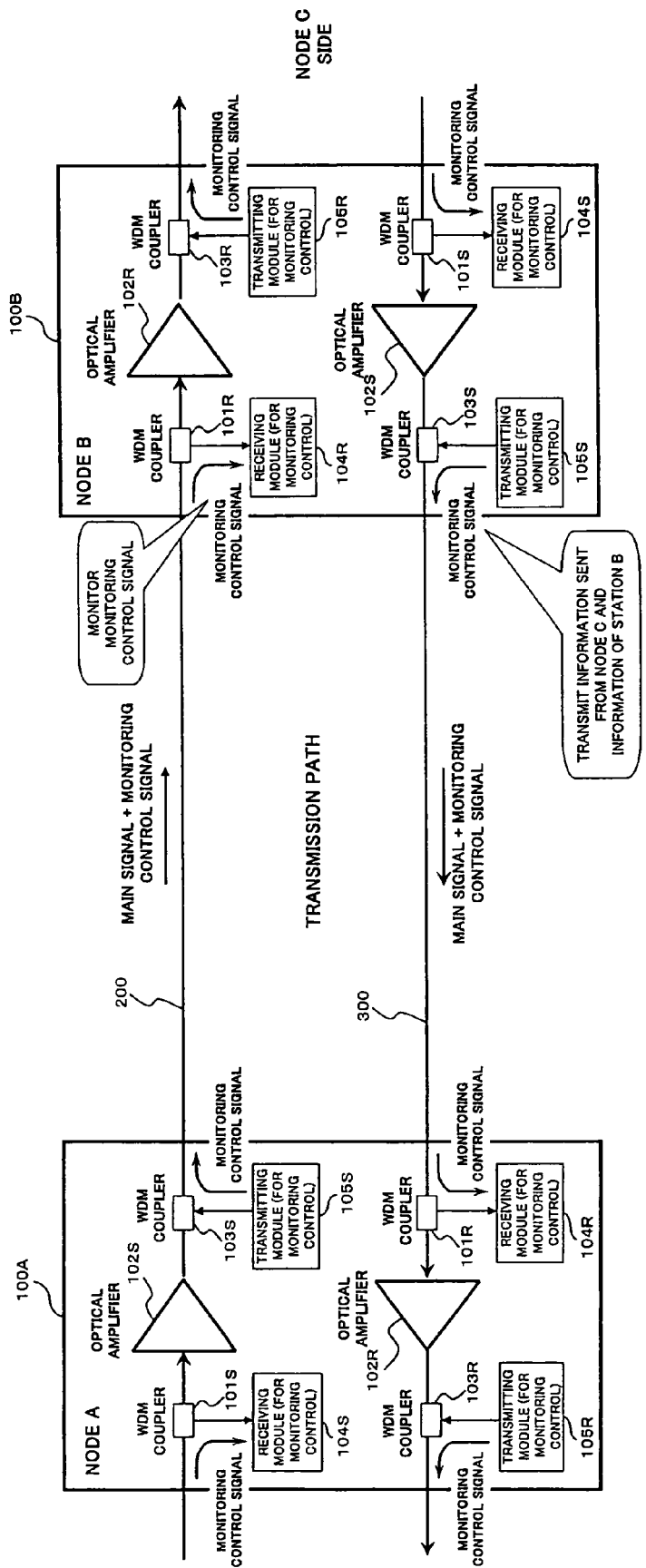
FIG. 10 is a block diagram showing an arrangement of a conventional WDM optical transmission system.
Figure 11:
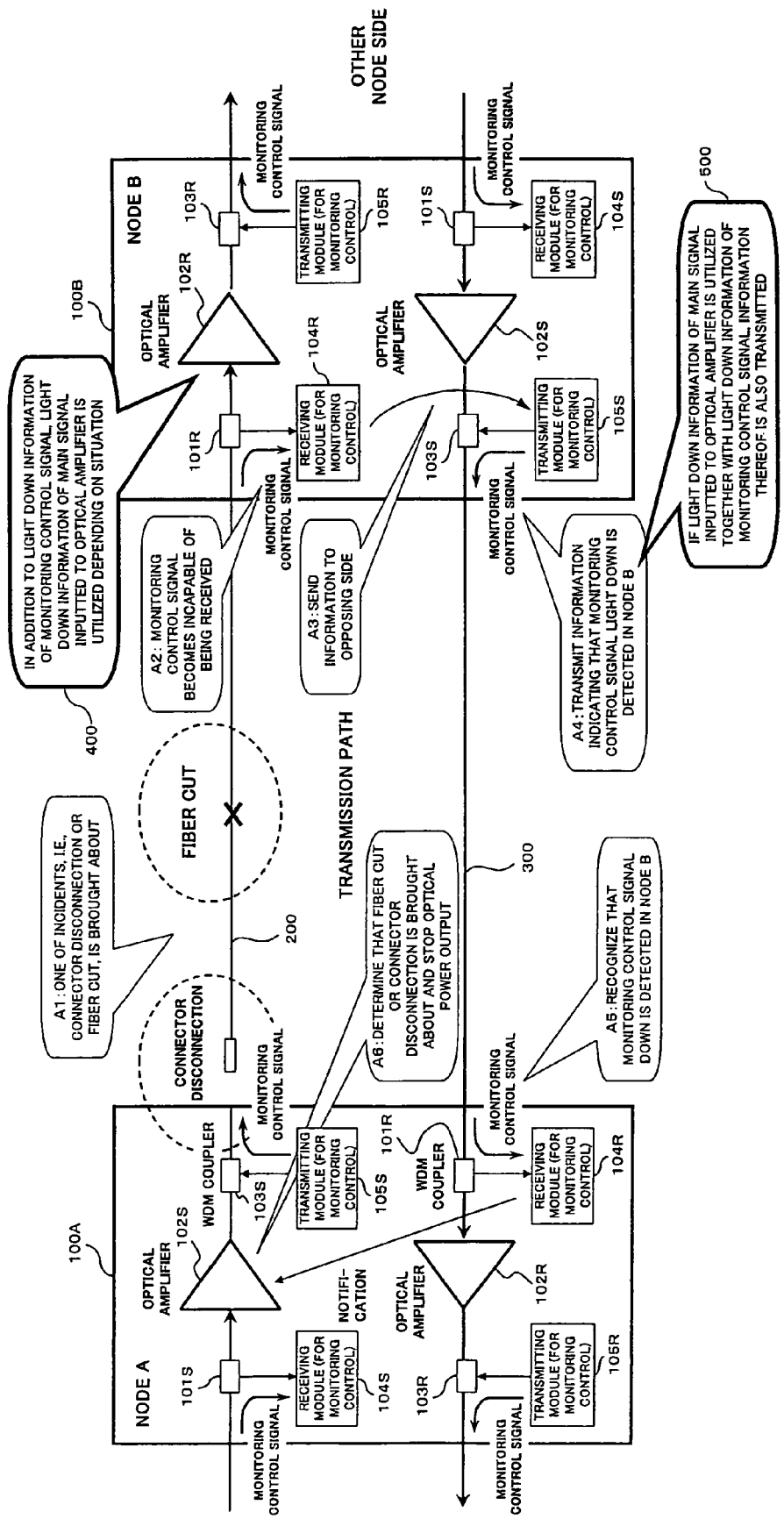
FIG. 11 is a block diagram showing an arrangement of the WDM optical transmission system to which reference is made for explaining a conventional APSD control.
Figure 12:
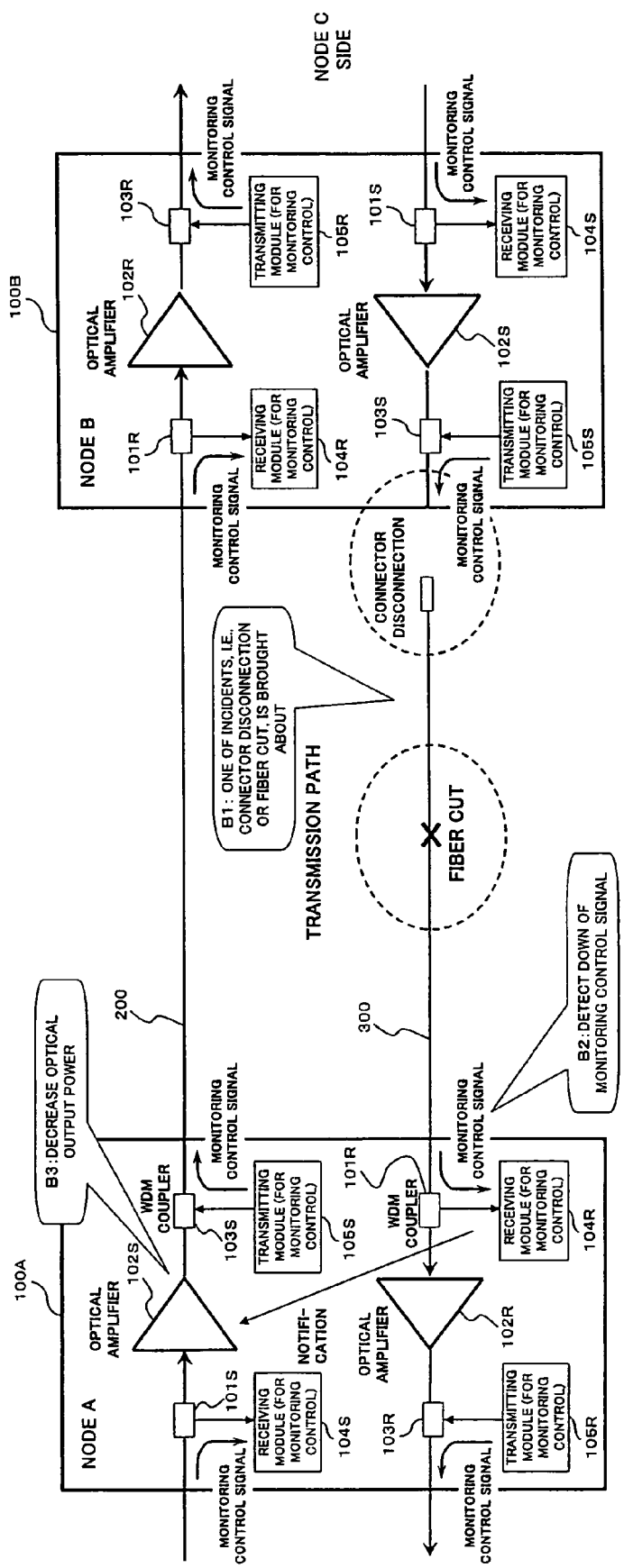
FIG. 12 is a block diagram showing an arrangement of the WDM optical transmission system to which reference is made for explaining another event brought about in the conventional APSD control.

FIG. 1 is a block diagram showing an arrangement of a WDM optical transmission system as a first embodiment of the present invention. Similarly to the aforesaid system described with reference to FIG. 10, the WDM optical transmission system shown in FIG. 1 also is arranged to include an optical transmission apparatus (optical node) 1A (station A) and an optical transmission apparatus (optical node) 1B (station B) which are cross-connected to each other through a couple (two) of optical transmission paths (transmission path fibers) 200 and 300. Thus, bidirectional communication can be performed in the arrangement.

Also in the present embodiment, each of the optical transmission apparatus (hereinafter sometimes simply referred to as "node" or "station") 1A and 1B has a symmetrical arrangement. That is, each of the optical transmission apparatus has, as a transmission system, WDM couplers 11S and 13S, an optical amplifier 12S, a receiving module 14S and a transmitting module 15S for use in monitoring control. Each of the optical transmission apparatus has, as a reception system, WDM couplers 11R and 13R, an optical amplifier 12R, a receiving module 14R and a transmitting module 15R for use in monitoring control. This reception system additionally has a control circuit 16. In the following description, the control circuit 16 of the station 16A is denoted by 16A while the control circuit 16 of the station 16B is denoted by 16B.

Also in this case, in the transmission systems of the stations 1A and 1B, the WDM coupler 11S is a unit for extracting a monitoring control signal contained in the received WDM signal light as an OSC ray of light and supplying the same to the receiving module 14S. The optical amplifier 12S is a unit for amplifying optical power level of the received WDM signal light to a necessary transmission optical output level depending on the transmitting distance from the source to the next node 1B (or 1A). This amplification is collectively performed for respective wavelengths. The WDM coupler 13S is a unit for coupling the OSC ray of light (monitoring control singal) sent from the transmitting module 15S to the WDM signal light having undergone the amplification in the optical amplifier 12S and outputting the resultant signal to the optical transmission path 200 (or 300).

The receiving module 14S is a unit for receiving the OSC light (monitoring control signal) from the WDM coupler 11S. The transmitting module 15S is a unit for generating information to be notified for the next node (upstream side station) 1B (or 1A) as the monitoring control signal.

Conversely, in the receiving system of respective stations 1A and 1B, the WDM coupler 11R is a unit for branching the OSC signal (monitoring control signal) contained in the received WDM signal supplied from the optical transmission path 300 or 200 to the receiving module 14R. The optical amplifier 12R is a unit for amplifying the optical output power to a necessary level which enables the received WDM signal light supplied from the WDM coupler 11R to be sent to the next node in the subsequent stage depending on the transmission distance between the source to the destination. This amplification is collectively performed for respective wavelengths. The WDM coupler 13R is a unit for coupling the OSC light (monitoring control signal) from the transmission nodule 15R to the WDM signal light having undergone amplification in the optical amplifier 12R.

The receiving module 14R is a unit for receiving the OSC light (monitoring control signal) transmitted from the WDM coupler 11R. The transmitting module 15R is a unit for generating information to be notified for the next node (station located on the upstream side) as the monitoring control signal.

Also in the present embodiment, a general arrangement suitable for each of the above optical amplifiers 12S and 12R is an optical fiber amplifier doped with rare-earth elements such as those of EDFA. For example, a Raman amplifier can be utilized together with the above optical amplifiers 12S and 12R.

In each of the stations 1A and 1B, the control circuit 16 serves as a unit for unitarily controlling the operation of the station itself including the APSD control. In the present invention, the control circuit 16 can additionally play the following roles. That is, the control circuit 16 responds to an instruction of APSD control restoration setting from a maintenance terminal 700 or the like so that the APSD inhibition status is canceled in a manual manner or in an automatic manner by using a restoration time. The control circuit 16 also responds to restoration detecting information of an OSC light (monitoring control light) down sent from the station on the downstream side so that the APSD inhibition status is canceled in an automatic manner. As will be described later on, the control circuit 16 has functions that can monitor the input/output light of the optical amplifiers 12S and 12R so that AGC (Automatic Gain Control) can be properly activated or can perform desired alarm generation processing.

Description will be hereinafter made on the APSD restoration operation which is performed in the WDM optical transmission system of the present embodiment arranged as described above.

Initially, as described above, a maintenance engineer accesses the station 1A through the maintenance terminal 700 to provide APSD inhibition setting instruction (or timer count setting instruction) (step S1). The control circuit 16 responds to the instruction to reset the restoration timer count, and the timer starts counting (step S2). Thereafter, the control circuit 16 examines whether the instruction of the inhibition status cancellation setting is inputted through the maintenance terminal 700 or not, whether the restoration timer times out at the predetermined time counting or not, or whether or not the station 1B on the downstream side detects the status change (light down to light down restoration) brought about in the monitoring control light path and notification indicative of the detection is sent through the opposing monitoring control light (No-routes of steps S3, S4 and S5).

That is, the control circuit 16 of the present embodiment has a function as a canceling instruction detecting unit for detecting a canceling instruction for canceling the inhibition status of the APSD control and a function as a restoration timer for counting a predetermined period of time starting from a timing point when the inhibition status is set to the APSD control. Owing to these functions, if the canceling instruction is detected or the predetermined period of time is counted by the restoration timer, the aforesaid inhibition status setting is canceled.

When the control circuit 16 is placed in the monitoring state, if an instruction of the inhibition status cancellation (canceling instruction) is inputted through the maintenance terminal 700 (Yes route at step S3) or the restoration timer finishes the counting of the predetermined period of time (Yes route at step S4), then the control circuit 16A of the self station 1A automatically cancels the inhibition status (step S6) and an ordinary management mode is taken place.

In addition, as shown in FIG. 1, if the transmission path fiber 200 is again connected to an output port of the station 1A after optical output power measurement or the like, the monitoring control light is again supplied through the transmission path fiber 200 (step S11) and the station 1B on the downstream side receives at the receiving module 14R the monitoring control light (step S12). In this way, the receiving module 14R of the downstream side station 1B informs the transmitting module 15S on the opposing side of the monitoring control light restoration through the control circuit 16B, and the transmitting module 15S informs the station 1A of this fact by means of the monitoring control light through the optical transmission path 300 (step S13).

The station 1A receives the aforesaid restoration information at the receiving module 14R (step S14) and this restoration information is supplied to the control circuit 16A. In this way, as shown in FIG. 2, the control circuit 16A can recognize that the downstream-side station 1B restores the monitoring control light receiving condition (Yes-route at step S5) and the inhibition status of the station 1A is automatically canceled (step S6 or step S15 in FIG. 1).

That is, in the above example, the receiving module 14R serves as an optical conduction detecting means for detecting the optical conduction to the downstream-side station 1B after inhibition status is set to the APSD control. In more concretely, the receiving module 14R serves as a light down information detecting unit (monitoring control light restoration information detecting unit) for detecting information of light down restoration of the monitoring control light as light down restoration information sent from the downstream side station 1B. The control circuit 16A serves as an optical path cut restoration trigger canceling unit which responds to the detection by the light down information detecting unit (monitoring control light restoration information detecting unit) of the information of the light down restoration of the monitoring control light so that the APSD control inhibition status is canceled.

Figure 2:
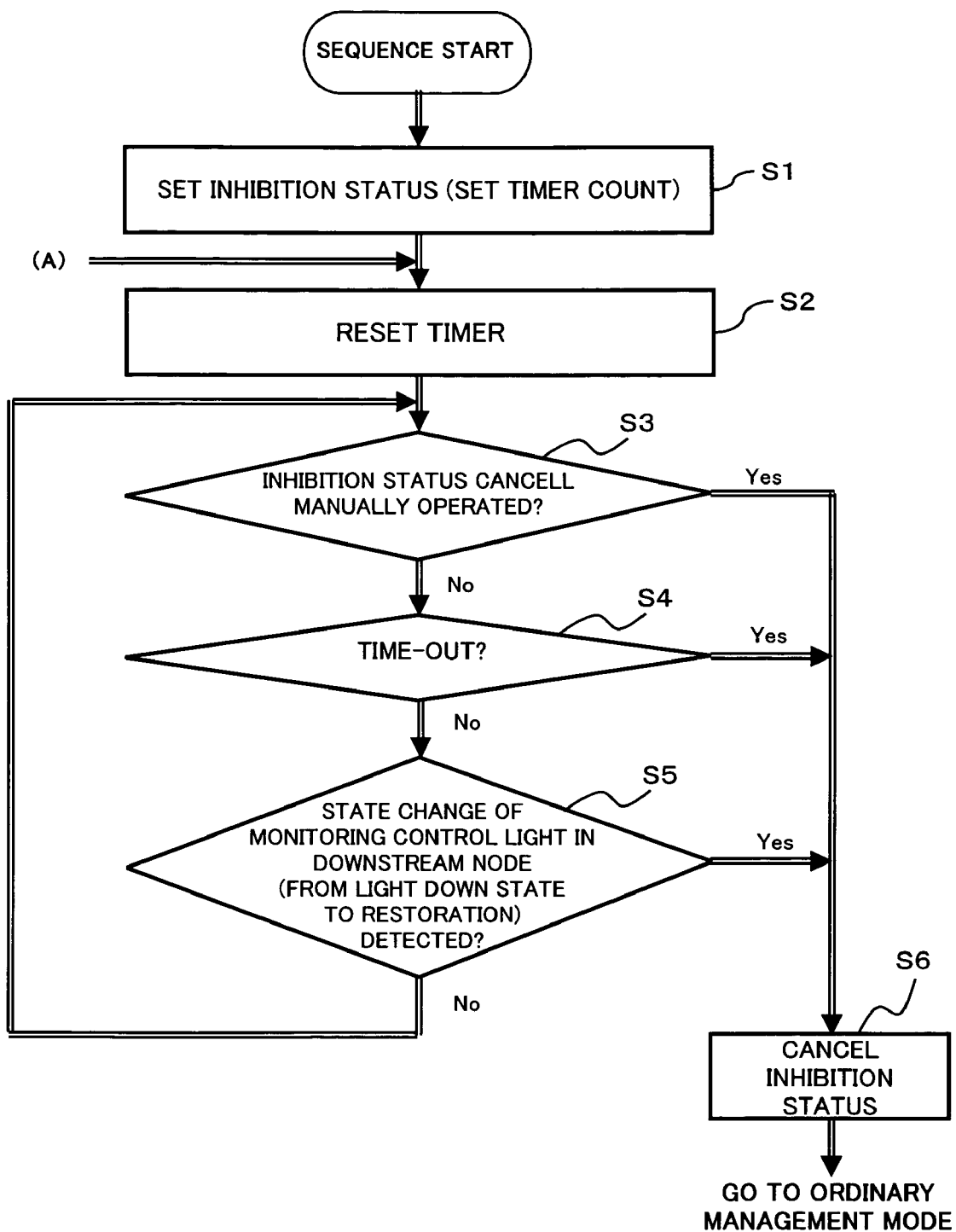
FIG. 2 is a flowchart for explaining operation (APSD control inhibition status automatic cancellation) of the WDM transmission system shown in FIG. 1.
Figure 6:
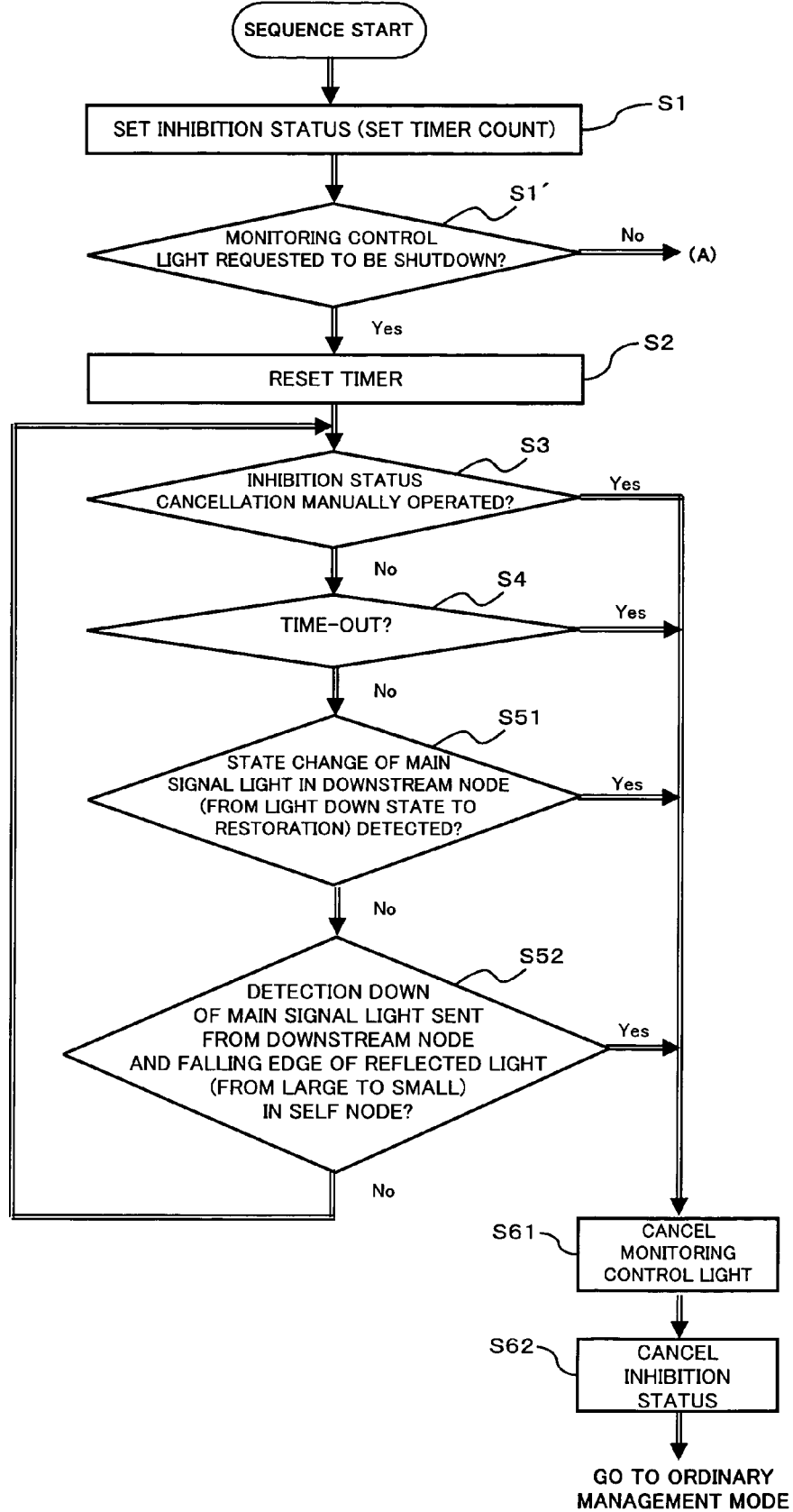
FIG. 6 is a flowchart for explaining operation of APSD control inhibition status automatic cancellation according to a second modification of the first embodiment.

An arrow (A) shown in FIG. 2 corresponds to an arrow (A) in FIG. 6. As will be described later on with reference to FIG. 6, if the monitoring control light is not halted (shutdown), the processing of step S2 and those following the step S2 is executed.

As described above, according to the present embodiment, the inhibition status is automatically canceled in response to a trigger of the optical path restoration of the monitoring control light at the downstream-side station 1B. Thus, if the maintenance engineer restores the connection status of the transmission path fiber 200 (reconnect the transmission path fiber 200) to the station 1A after the optical output power measurement or the like on the station 1A, the station 1A is automatically brought into the ordinary management mode regardless of the inhibition status maintaining time period (timer counting period). Accordingly, even if the transmission path fiber 200 is pulled out from the connector of the station 1A after the ordinary management mode, the APSD control is activated, with the result that inadvertent high power optical emission can be reliably prevented from being brought about at the end of the fiber.

While in the above example description has been made on a case in which one of the transmission path fibers, i.e., the transmission path fiber 200 is pulled out from one of the stations, i.e., the station 1A, it is needless to say that operation similar to one described above can be expected in a case where the other transmission path fiber 300 is connected to or disconnected from the station 1A or in a case where the transmission path fiber 200 or 300 is connected to or disconnected from the station 1B. That is, the inhibition status can be automatically canceled in response to the trigger of the optical path restoration of the monitoring control light at the downstream-side station.

Further, if the inhibition status cancellation is made in response to the trigger of the downstream-side light down restoration as described above, the trigger derives not necessarily from the light down restoration of the monitoring control light but from the light down restoration of the main signal light. That is, if the inhibition status is set to the APSD control, the main signal light is outputted from the station 1A or 1b to the downstream-side station 1B or 1A. Under this condition, if the optical path fiber 200 or 300 is reconnected, the optical amplifier 12R on the downstream-side will detect optical input power level variation indicating a status change from the light down status to the input power level presence status. Therefore, the inhibition status automatic cancellation can be performed in response to the status change of the main signal light in a manner similar to that in which the monitoring control light restoration is utilized as a trigger. In this case, the receiving module (light down restoration information detecting unit) 14R of the upstream-side station 1A (1B) will serve as a main signal light restoration information detecting unit detecting the light down restoration information of the main signal light sent from the downstream side station 1B (1A).

While in the above example the inhibition status cancellation is performed when the inhibition status is canceled manually and when the restoration timer time-out is detected, it is sufficient for the inhibition status cancellation to be performed at least when the restoration information of the monitoring control light is detected on the downstream-side station. Therefore, the object of the present invention can be attained regardless of the monitoring of one of or both of the inhibition status manual cancellation and the restoration timer time-out monitoring.

(A1) Description of First Modification

The above-described manner of control can be utilized in the case shown in FIG. 1, i.e., in the case where the station under optical output power measurement is connected with the optical transmission path fiber 300 extending from the opponent station which is not placed under the optical output power measurement, and the monitoring control light is sent from the station 1B-side to the station 1A. However, in this manner of control, the inhibition status automatic cancellation cannot be effected in other cases. In other words, if the station 1A is connected with the optical transmission path fiber 300 extending from the opponent side station and the monitoring control light is not sent from the station 1B, the station 1A cannot be informed of the light down restoration taken place in the station 1B through a fact that the optical transmission path fiber 200 is connected to the station 1A. It follows that the station 1A cannot obtain the restoration trigger which the station 1A responds to upon canceling the inhibition status.

Figure 4:
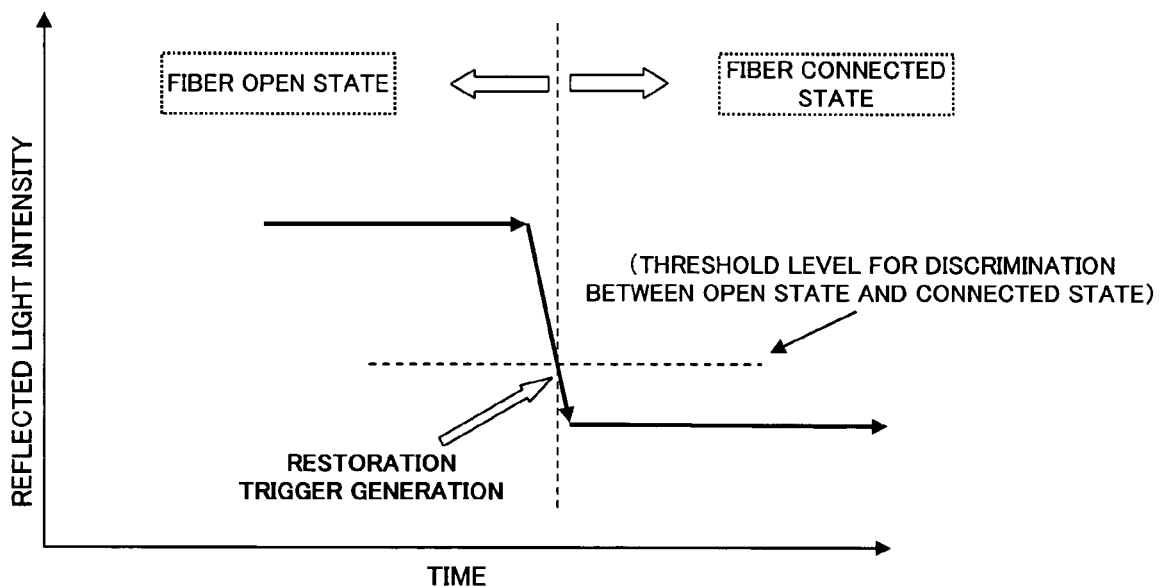
FIG. 4 is a diagram for explaining relationship between the reflected light amount variation and the optical transmission path connection state of the optical transmission apparatus shown in FIG. 3.

According to the arrangement of the present modification, a method is employed together with the above-described method, i.e., a method in which detection is made on the reflected light amount variation of the optical output at both of the stations 1A and 1B. As for example shown in FIG. 4, if the reflected light amount intensity is greater than a certain threshold level, it can be considered that the connector is opened or the port of the station under measurement is connected to an optical power meter or the like, while if the reflected light amount intensity is smaller than the threshold level, it can be considered that the port of the station under measurement is connected to the optical transmission path 200 or 300. Therefore, even if the optical transmission path fiber 300 or 200 of the opponent side is not connected thereto, the station 1A can obtain the restoration trigger when the optical transmission path fiber 200 or 300 is reconnected to the station 1A or 1B.

Figure 3:
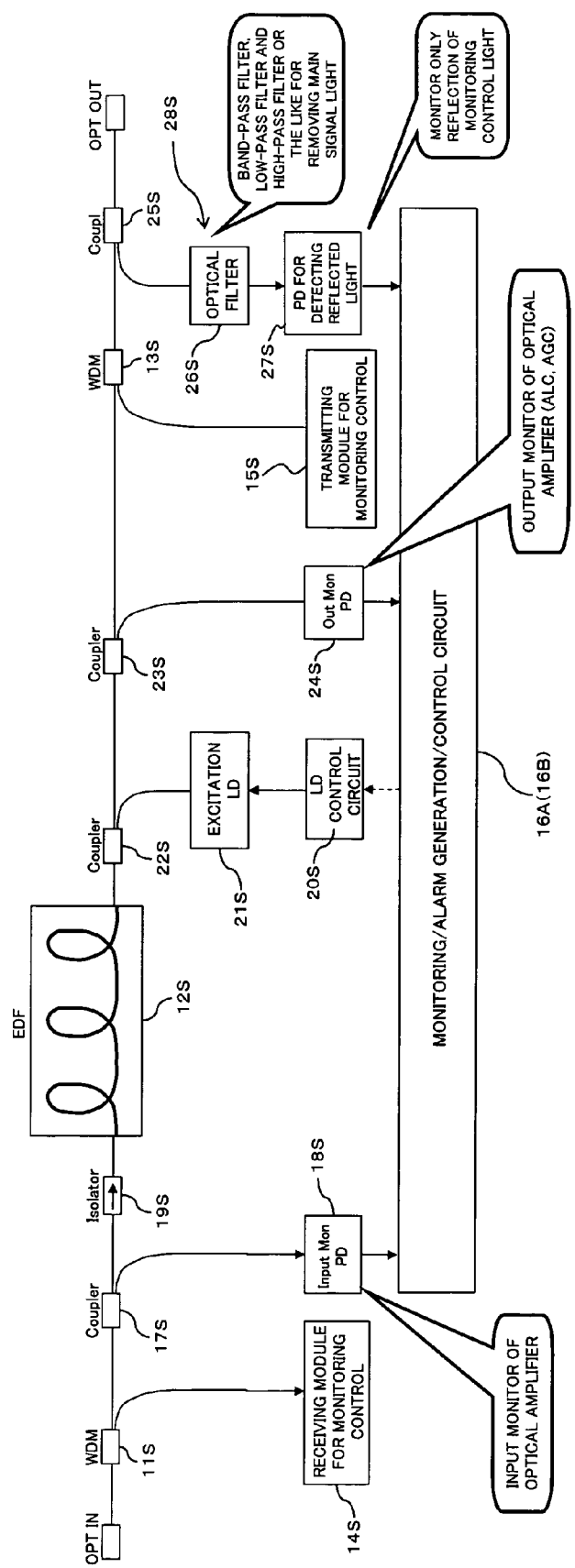
FIG. 3 is a block diagram showing an arrangement of a main portion an optical transmission apparatus according to a first modification of the first embodiment.

To this end, as for example shown in FIG. 3, the arrangement of the present modification is additionally provided with an output reflected light monitoring circuit (reflected light monitoring unit) 28S which is composed of an optical coupler 25S, an optical filter unit 26S and a reflected light detector 27S.

In this case, the optical coupler 25S is a device for leading reflected light to the optical filter 26S, the reflected light reflecting at the optical output port of the station 1A (1B) from which the optical transmission path fiber will extend toward the downstream side station 1B (1a). The optical filter 26S is a device for removing a main signal light component from the reflected light from the optical coupler 25S and allowing only the monitoring control light component to pass therethrough. The optical filter 26S may be composed of a band-pass filter, a low-pass filter or a high-pass filter or a combination of these components depending on the wavelength of the main signal light and the monitoring control light. The reflected light detector 27S is a device for receiving the monitoring control light passing through the optical filter 26S and outputting a signal having an intensity corresponding to the received light amount, to the control circuit 16. This reflected light detector 27S is composed of a PIN photodiode or the like, for example.

That is, the aforesaid output reflected light monitoring circuit 28s serves as a monitoring control light reflected amount monitoring unit for monitoring the reflected light amount of the monitoring control light reflected toward the downstream-side station 1B (1A) as the aforesaid reflected light amount.

In FIG. 3, reference numeral 17S represents an optical coupler for branching a part of the light to be inputted to the optical amplifier 12S as input monitoring light, 18S (PD) an input light detector for receiving the input monitoring light from the optical coupler 17S and outputting a signal having an intensity corresponding to the received light amount, to the control circuit 16, 19S an optical isolator for preventing the light to be inputted into the optical amplifier 12S from being returned, 21S an excitation light laser made up of a semiconductor laser or the like for generating excitation light for use in the optical amplifier 12S, 20S an excitation light control circuit for controlling excitation light power of the excitation light laser, 22S an optical coupler for leading the excitation light into the optical amplifier 12S, 23S an optical coupler for branching off a part of light beam bundle outputted from the optical amplifier 12S to an output photo-detector 24S as an output monitoring light, 24S the output photo-detector (PD) for receiving the output monitoring light from the optical coupler 23S and outputting a signal having an intensity corresponding to the received light amount, to the control circuit 16.

That is, according to the arrangement of the station 1A (1B) shown in FIG. 3, the input/output optical power of the optical amplifier 12S is detected by each of the detectors 18S and 24S, and the control circuit 16 responds to the result of detection so that the excitation optical power of the excitation light laser 21S is subjected to the automatic level control (ALC) or the automatic gain control (AGC).

Now description will be made on the APSD inhibition status automatic canceling operation performed in the station 1A (1B) arranged as described above.

Figure 5:
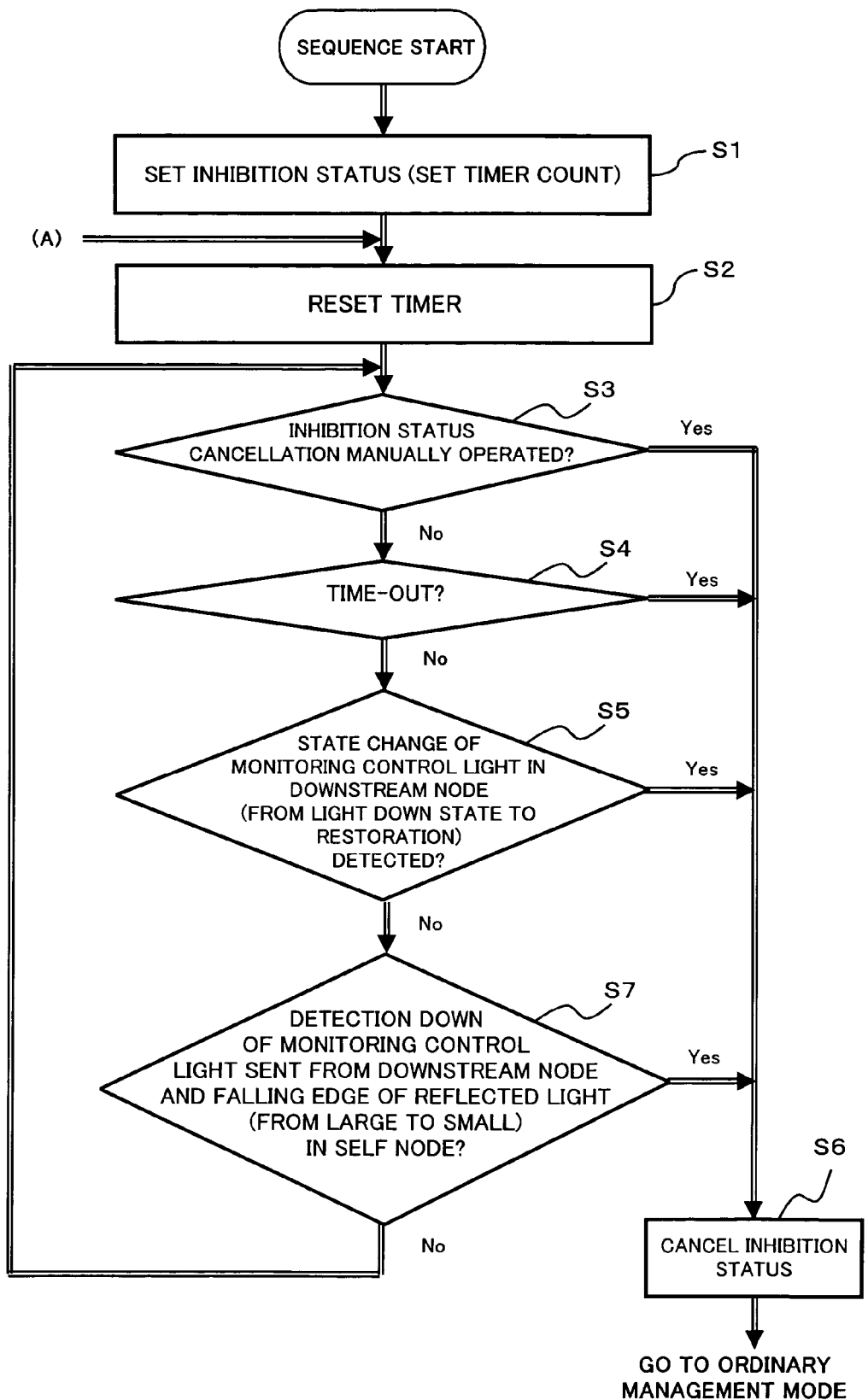
FIG. 5 is a flowchart for explaining operation of APSD control inhibition status automatic cancellation according to the first modification of the first embodiment.

Initially, also in this case, as shown in FIG. 5, a maintenance engineer accesses the station 1A (1B) through the maintenance terminal 700 to provide APSD inhibition status setting instruction (or timer count setting instruction) (step S1). The control circuit 16 responds to the instruction to reset the restoration timer count, and the timer starts counting (step S2). Thereafter, the control circuit 16 examines whether the instruction of the inhibition status canceling setting is inputted through the maintenance terminal 700 or not (step S3), whether the restoration timer times out at the predetermined time counting or not (step S4), or whether or not information of monitoring control light restoration is sent from the downstream-side station 1B (1A) (step S5). In addition to these examination steps, the control circuit 16 examines whether the information of the monitoring control light sent from the downstream-side station 1B (1A) is detected or not and whether the reflected light rising edge (state transition from reflected light amount large to reflected light amount small) is detected by the output reflected light monitor 28S or not (step S7) (No-routes of steps S3, S4, S5 and S7).

When the control circuit 16 is placed in the monitoring state, if an instruction of the inhibition status cancellation is inputted through the maintenance terminal 700 (Yes-route at step S3), the restoration timer finishes the counting of the predetermined period of time (Yes-route at step S4), or the restoration information of the monitoring control light is sent from the downstream-side station 1B (1A) (Yes-route at step S5), then the control circuit 16 of the self station 1A (1B) automatically cancels the inhibition status (step S6) and an ordinary management mode is taken place.

In addition to what described above, if light down information of the monitoring control light is sent from the downstream-side station 1B (1A) and the output reflected light monitoring circuit 28S of the self station 1A (1B) detects the light amount variation in the monitoring control light (transition from reflected light amount large to reflected light amount small) (Yes-route of step S7), which condition actually corresponds to, for example, a case that the optical transmission path fiber 300 of the opponent side is cut and the optical transmission path fiber 200 is reconnected to the station 1A, then the control circuit 16 responds to the incident so that the inhibition status of the self station 1A is automatically canceled (step S6). That is, the control circuit 16 in this case serves as a reflected light amount variation trigger canceling unit which responds to the incident that the output reflected light monitoring circuit 28S detects the decrease in the reflected light amount of the monitoring control light so that the APSD control inhibition status is canceled.

As described above, according to the arrangement of the present modification, even if the optical transmission path fiber 300 or 200 of the opponent side is placed in a cut state and the monitoring control light becomes incapable of being transmitted (i.e., the system suffers from double failures of cut states in both of the optical transmission path fibers 200 and 300), control can be activated in response to the restoration trigger of the rising edge (transition from reflected light amount large to reflected light amount small) of the output reflected light (reflected light of the monitoring control light) at the self station 1A (1B). Thus, the inhibition status of the self station 1A (1B) can be automatically canceled under a closed control of the self station 1A (1B).

Accordingly, if one of the station 1A or 1B is set up in a stand-alone state, when the optical path fiber 200 or 300 is reconnected to the station 1A (1B), the inhibition status is automatically canceled. Therefore, if the optical transmission path fiber 200 or 300 is pulled out from the station in the subsequent stage, the APSD control is activated and high power optical power can be prevented from being inadvertently outputted.

While in the above example the reflected light of the monitoring control light is utilized, the reflected light variation of the main signal light can be utilized as a trigger for canceling the inhibition status, because the main signal light is placed in the output mode during the inhibition status. In this case, the aforesaid output reflected light monitoring circuit 28S (see FIG. 3) is arranged to be a main signal light reflected amount monitoring unit in which the optical filter 26S has a characteristic allowing only the main signal light component to pass therethrough (or alternatively, the optical filter 26S is made to be a pass wavelength band variable type optical filter and the pass wavelength band may be varied), and monitoring is made on the main signal light reflected light amount as the reflected light amount at the optical output port.

However, there is a difference in accuracy of trigger between a case in which the signal down state restoration in the downstream-side station is utilized as a trigger and a case in which the reflected light amount variation in the self station is utilized as a trigger. That is, the former case has a higher accuracy. For this reason, it is desirable that the former case is more suitable to be employed. That is, if the self station detects that the connection to the downstream-side station is not established, i.e., the light down information of the monitoring control signal is sent from the downstream side station, then the latter case shall be employed.

Further, the determination processing at step S5 (i.e., monitoring of whether the restoration information of the monitoring control sight is detected in the downstream-side station) may be omitted. Further, the object of the present invention can be attained regardless of the monitoring of one of or both of the inhibition status manual cancellation and the restoration timer time-out monitoring.

(A2) Description of Second Modification

The main purpose of the inhibition status setting in the APSD control is to provide a proper environment for optical power measurement, spectrum confirmation or the like upon setting up the apparatus, the trouble inspection or the like. When the inhibition status is taken place, both of the monitoring control light and the output port are outputted from the output port. Therefore, the output of the optical amplifier 12S (12R) cannot be measured accurately upon optical power measurement. However, if the monitoring control light is not utilized as the restoration trigger for canceling the inhibition status setting, no inconvenience will be caused even if the monitoring control light is halted during the inhibition status.

The second modification takes the advantage of the above merit. That is, the monitoring control light is halted during the inhibition status so that the optical output of the main signal light can be more accurately measured. In this case, the main signal restoration edge on the downstream side or the reflected light amount decrease (falling edge of the reflected light amount) of the main signal on the self station is utilized as a trigger and the monitoring control light shutdown mode is canceled in response to the edge. At the same time, the ordinary management mode is taken place. In this case, the aforesaid optical filter 26S (see FIG. 3) is formed of one having a characteristic which allows the main signal component to pass therethrough (alternatively, the optical filter 26S is formed of one of pass wavelength band variable type so that the pass wavelength band is properly changed). Operation in this case will be described with reference to FIG. 6.

As shown in FIG. 6, the maintenance engineer accesses the station 1A (1B) through the maintenance terminal 700 to input an instruction of the APSD inhibit status setting (or timer value setting) (step S1). The control circuit 16 responds to the instruction to determine whether the monitoring control light should be shutdown or not (step S1'). If it is determined that the monitoring control light shall be shutdown in accordance with the instruction inputted through the maintenance terminal 700 (Yes-route is selected at step S1'), then the control circuit 16 effects a shutdown control on the monitoring control light and the restoration timer is reset and the timer starts counting of the count value (step S2). That is, the control circuit 16 in this case serves as a monitoring control light shutdown control unit for effecting shutdown control on the monitoring control light sent to the downstream-side station 1B (1A) when the APSD control inhibition status is set.

Thereafter, the control circuit 16 monitors whether the inhibition status canceling instruction is inputted through the maintenance terminal 700 or not (step S3), whether the restoration timer times out or not (step S4), whether the main signal light restoration is informed from the downstream-side station 1B (1A) or not (step S5), and whether or not the monitoring control light down information is sent from the downstream-side station 1B (1A) and the output reflected light monitoring circuit 28S detects the falling edge of the main signal reflected light (transition from reflected light amount large to reflected light amount small) (step S52) (No-routes of steps S3, S4, S51, S52).

Under this monitoring condition, if the inhibition status canceling instruction is inputted through the monitoring terminal 700 (Yes-route of step S3), when the restoration timer reaches the time-out (Yes-route of step S4), then the control circuit 16 cancels the shutdown mode of the monitoring control light (step S61) and automatically cancels the APSD inhibition status (step S62). Thus the ordinary management mode is taken place.

In addition, when the station 1A detects the main signal light restoration information sent from the downstream-side station 1B (1A) (Yes-route of step S51) or when the monitoring control light down information is sent from the downstream-side station 1B (1A) and the self station 1A (1B) detects the falling edge of the main signal light reflected light (Yes-route of step S52), the control circuit 16 cancels the monitoring control light shut-down mode (step S61) and automatically cancels the APSD inhibition status (step S62). Thus the ordinary management mode is taken place.

In this way, the restoration trigger for canceling the inhibition status is formed not by using the monitoring control light but by using the main signal light. As a consequence, it becomes possible to improve the accuracy of optical output measurement of the main signal light while to automatically cancel the inhibition status.

If the monitoring control light is not brought into the shutdown mode, the control circuit 16 can execute the processing after the step S2 which has been described with reference FIGS. 2 and 5 (No-route of step S1').

The above-described determining processing at step S51 (monitoring of whether or not the main signal light restoration information is detected at the downstream-side station) may be omitted. Also in the present modification, the object of the present invention can be attained regardless of the monitoring of one of or both of the inhibition status manual cancellation and the restoration timer time-out monitoring.

[B] Description of Second Embodiment

Transmission Path Fiber Open Real Time Management

When the inhibition status is taken place in the upstream-side station 1A (1B), the time setting of the restoration timer can be arbitrarily performed from the maintenance terminal 700. The restoration timer will star time counting from the timing point when the inhibition status is taken place. In this case one situation can be considered that when the inhibition status is taken place, the station is connected with the transmission path fiber 200 (300) (i.e., the station is brought into the ordinary management mode). In this case, light will emit from the fiber during a time period corresponding to a time interval, i.e., from a timing point when the timer has time set to a timing point when the transmission path fiber 200 (300) is pulled out.

In this case, if the timer setting time is reasonably short time, there will be no serious problem caused. However, if the timer setting time is excessively long, there can be happened the following situation. That is, if a person unintentionally pulls out the transmission path fiber 200 (300) before the inhibition status automatic cancellation due to the time-out, a high power optical output can be outputted unexpectedly.

Figure 7:
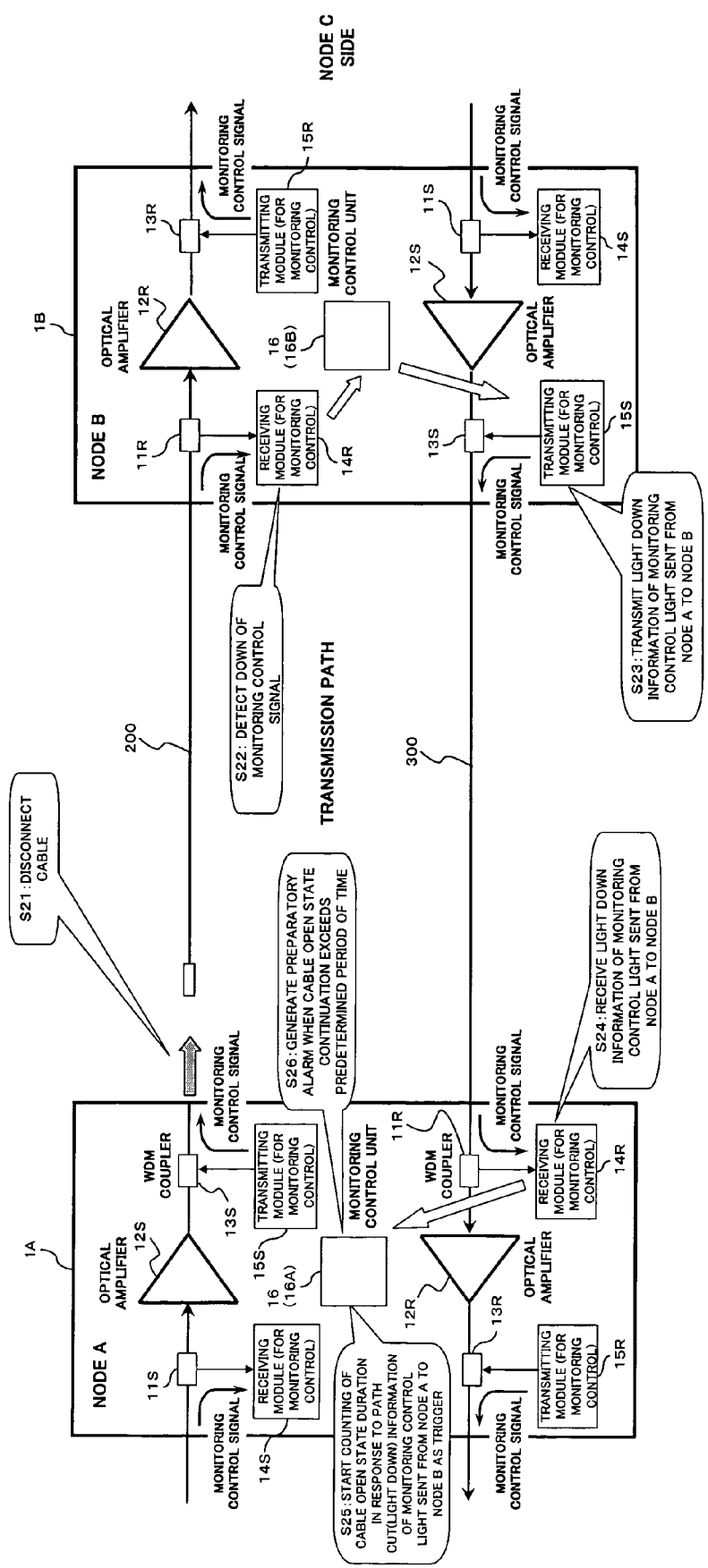
FIG. 7 is a block diagram showing an arrangement of the WDM optical transmission system to which reference is made for explaining a second embodiment (transmission path fiber open real time management) of the present invention.

The present embodiment seeks to handle the above problem by an arrangement as shown in FIG. 7, for example. That is, after the inhibition status is set, if the transmission path fiber 200 (300) is pulled out at the upstream-side station 1A (1B) (i.e., the monitoring control light down is detected), then the downstream-side station 1B (1A) detects this incident by receiving information indicative of the incident by means of the monitoring control light sent through the opposing transmission path fiber 300 (200) (steps S21 to S24). The control circuit 16 responds to the incident as a trigger so that a preparatory alarm counter is started in the self station 1A (1B) (step S25). If a predetermined period of time has been elapsed, a preparatory alarm is sent to the maintenance terminal 700 or the like (step S26). That is, the control circuit 16 serves as a preparatory alarm counter which starts time counting of the predetermined period of time when the light down information of the monitoring control light is received from the downstream-side station 1B (1A) after the APSD control inhibition status is set. The control circuit 16 also serves as an alarm generating unit for generating alarm when the predetermined period of time is counted by the counter.

In this way, management is effected on the real time from the timing point when the transmission path fiber 200 (300) is actually pulled out. Thus, the preparatory alarm can be generated to call attention of the maintenance engineer or the like to the fact that the actual open time can be excessively long before the inhibition status is set. Accordingly, it becomes possible to prevent a person from unintentionally pulling out the transmission path fiber 200 (300) before the inhibition status automatic cancellation due to the time-out, a high power optical output can be outputted unexpectedly, with the result that more improved security can be provided for maintenance work on the station 1A (1B).

(B1) Description of First Modification

Figure 8:
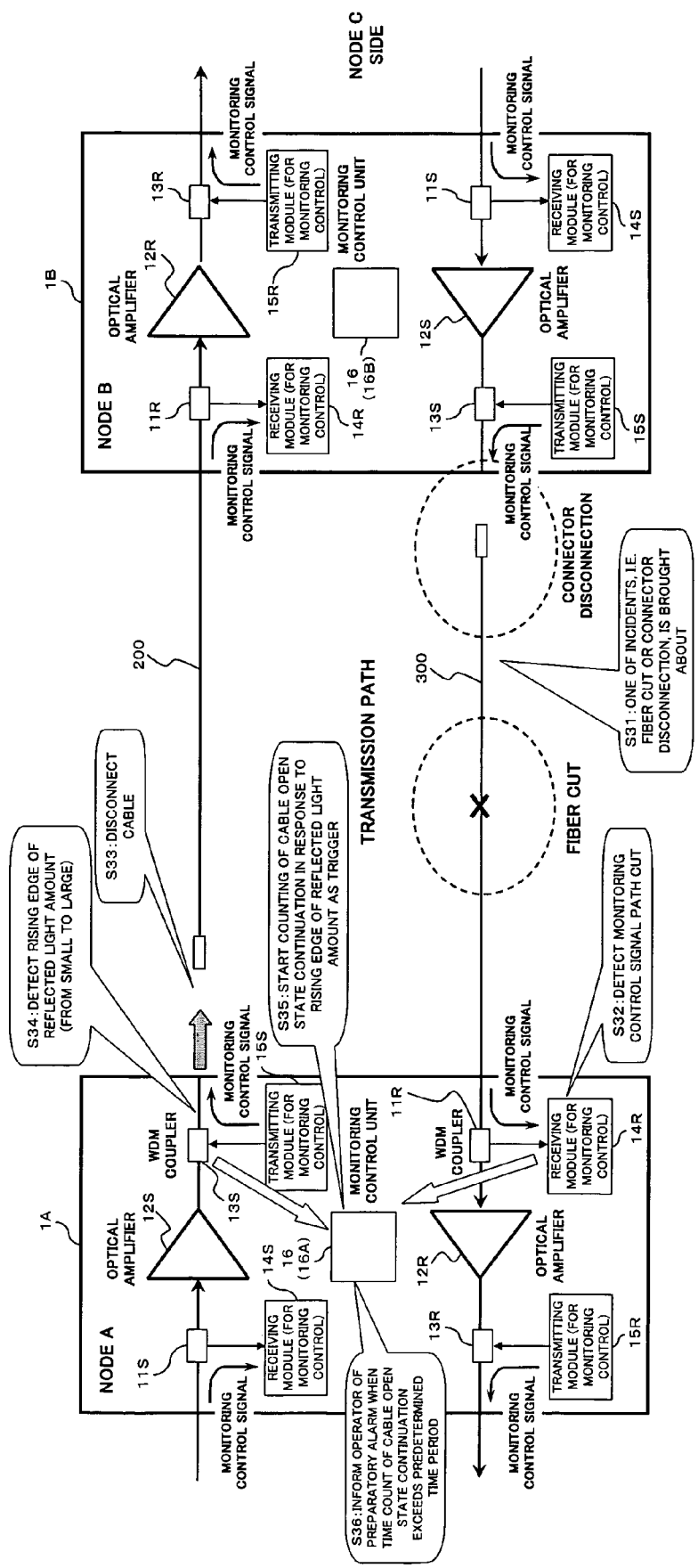
FIG. 8 is a block diagram showing an arrangement of the WDM optical transmission system to which reference is made for explaining a first modification of the second embodiment of the present invention.

A first modification of the second embodiment seeks to handle a case in which light down is brought about in both of the optical transmission paths 200 and 300. As for example shown in FIG. 8, a situation is considered such that the inhibition status has been set in the station 1A and the output port of the station 1A for the optical transmission path 200 is still not opened. In this situation, if the optical transmission path 300 on the opposing side suffers from light down condition due to a connector disconnection, fiber cut or the like (step S31), the station 1A becomes incapable of receiving the monitoring control light from the downstream-side station 1B. As a consequence, the upstream-side station 1A cannot recognize the light down condition of the transmission path fiber 200.

In this case, monitoring is made on variation in reflected light amount of optical output from the self station 1A so as to detect open state transition of the transmission path fiber 200.

That is, when the transmission path fiber 300 is placed in a path cut state, the receiving module 14R of the station 1A detects the light down state of the monitoring control light (step S32) and the control circuit 16A is notified of this incident. In this state, if the transmission path fiber 200 on the station 1A side is pulled out (step S33) and this fiber disconnection leads to reflected light amount variation (i.e., rising edge of from reflected light small to reflected light large is caused), the output reflected light monitoring circuit 28S (see FIG. 3) will detect the reflected light amount variation (step S34). Then, the control circuit 16A responds to the detection as a trigger to start the counting of the preparatory alarm counter (step S35).

Thereafter, if the count of the counter reaches a predetermined count and a predetermined period of time passage is confirmed, the control circuit 16A sends a message as a preparatory alarm indicating that the open state of the output port of the downstream-side station 1B continues for the predetermined period of time or more, to the maintenance terminal 700 or the like (step S36). The control circuit 16A may be arranged to respond only to the reflected light of the optical output from the station 1A itself for starting the counter. That is, the control circuit 16A in the present embodiment serves as a preparatory alarm counter which, after APSD control inhibition status is set, responds to the detection of the reflected light amount increase by the output reflected light monitoring circuit 28S for starting the predetermined period of time. The control circuit 16A in the present embodiment also serves as an alarm generating unit for generating an alarm when the counter counts the predetermined period of time.

With the above arrangement, even if both of the transmission paths 200 and 300 between the stations 1A and 1B suffer from light down state and thereafter the inhibition status is set to the station 1A (1B), the alarm generating unit can generate the preparatory alarm at a timing point when the predetermined period of time has elapsed after the transmission path fiber 200 (300) is actually disconnected.

In the above arrangement, if the inhibition status setting is made under condition that the transmission path fiber 200 (300) is already disconnected, i.e., the transmission path fiber 200 (300) is left unconnected and then the inhibition status is set, the self station 1A (1B) becomes incapable of detecting the variation of the reflected light amount of the optical output therefrom. Therefore, the counter will not start counting. Thus, the following countermeasure may be taken. That is, if the monitoring control light from the downstream-side station 1B suffers from the light down state (i.e., the opposing transmission path fiber is left unconnected or the path thereof is cut) and no variation is detected in the reflected light amount at the optical output port, the control circuit 16 may respond to the APSD control inhibition status setting so that the aforesaid counter is activated (started) and an alarm message is generated after the predetermined period of time passage.

(B2) Description of Second Modification

Figure 9:
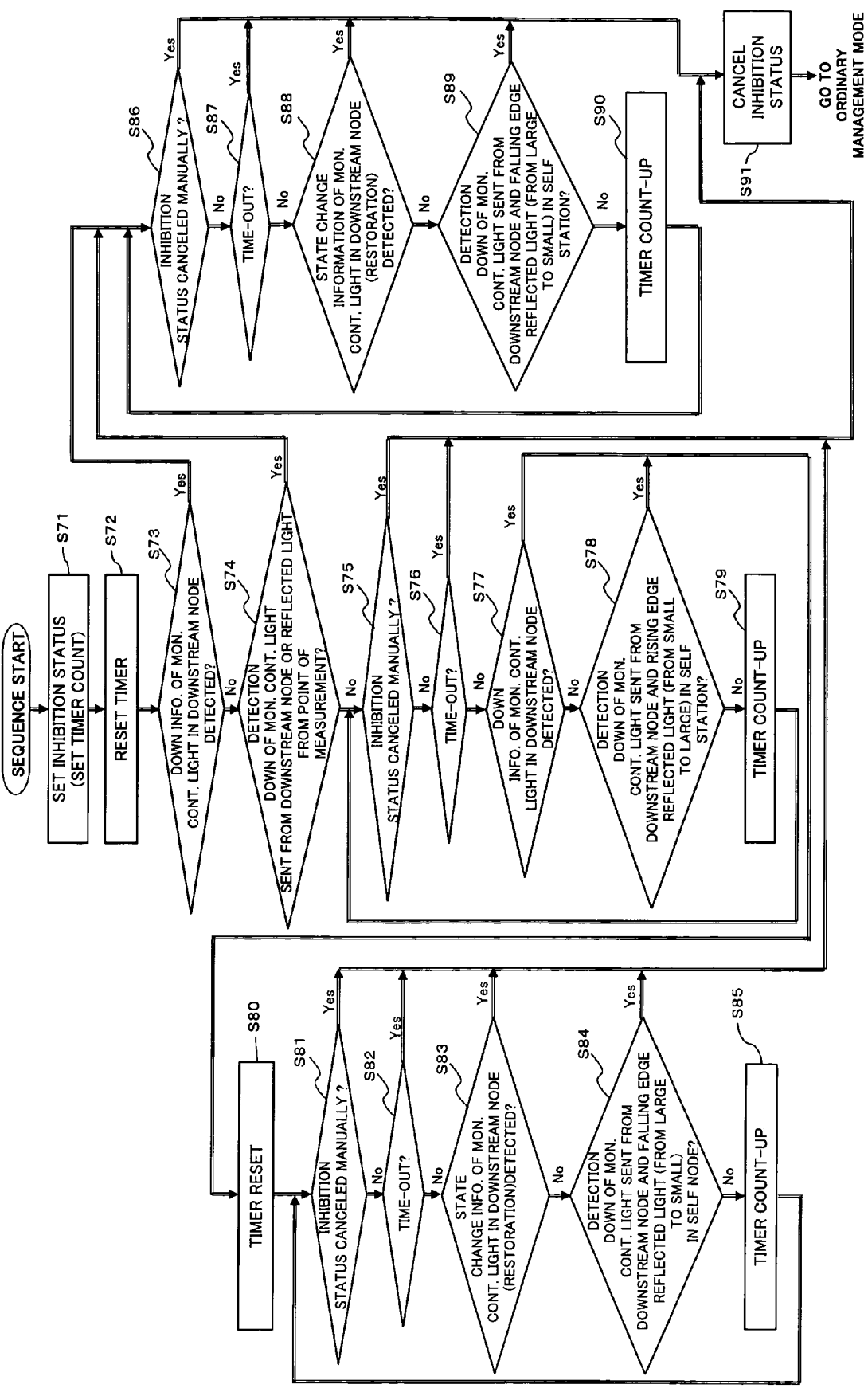
FIG. 9 is a flowchart for explaining a second modification of the second embodiment of the present invention.

Now description will be hereinafter made on a case of operation in which the already provided restoration timer is controlled in its counting operation so that real time management is effected on a situation after the transmission path fiber 200 (300) is actually pulled out and inhibition status is automatically canceled. This description will be made in detail with reference to a flowchart shown in FIG. 9.

Initially, when the APSD control inhibition status is set to the station 1A (1B) through the maintenance terminal 700 (i.e., timer count is set) (step S71), the control circuit 16 responds to the setting for resetting the count of the restoration timer (step S72). Thereafter, the control circuit 16 examines whether the light down information of the monitoring control light sent from the downstream-side station 1B (1A) is detected or not (step S73) and whether or not the output reflected light monitoring circuit 28S (see FIG. 3) detects the light down of the monitoring control light and reflected light from the downstream-side station 1B (1A) at a point under measurement (output port) (Step S74).

If it is determined that no detection is made in the cases (i.e., No-route is selected at both of the steps S73 and S74), that is, it is confirmed that the transmission path fiber 200 (300) normally connected, then the control circuit 16 examines whether the inhibition status is manually canceled through the maintenance terminal 700 or not (step S75), whether the restoration timer times out or not (step S76), or whether transmission path fiber disconnection is brought about or not [i.e., down of monitoring control light in the downstream-side station 1B (1A) is detected or not (step S77), or whether or not detection is made on light down of the monitoring control light from the downstream-side station 1B (1A) or the reflected light amount rising edge (transition from reflected light amount small to reflected light amount large) at the self station 1A (1B) (step S78)].

If the result of examination reveals that no detection is made on any of the above cases (i.e., No route is selected at steps S75 to S78), the control circuit 16 makes the restoration timer continue time counting by incrementing the count (step S78). In this manner, the restoration timer carries out the timer count increment until Yes-determination is made at any of the above steps S75 to S78.

If the inhibition status is manually canceled through the maintenance terminal 700 before the restoration timer times out (i.e., Yes-route at step S75), or the restoration timer times out without detecting the light down of the monitoring control light at the downstream-side station 1B (1A), the light down of the monitoring control light from the downstream-side station 1B (1A), or rising edge of the reflected light amount at the self station 1A (1B) (i.e., Yes-route at step S76), then the control circuit 16 automatically cancels the inhibition status (step S91) and the processing goes to the ordinary management mode (APSD control activated status).

Conversely, if detection is made on light down of the monitoring control light at the downstream-side station 1B (1A) (Yes-route at step S77), or light down of the monitoring control light from the downstream-side station 1B (1A) and the reflected light amount rising edge at the self station 1A (1B) (Yes-route at step S78), and as a consequence, transmission path fiber disconnection at the self station 1A (1B) is detected, then the control circuit 16 resets the timer count of the restoration timer (Yes-route of step S77 or step S78 to step S80). That is, the control circuit 16 starts real time measurement from a timing point when the output port of the self station 1A (1B) is actually opened.

Thereafter, the control circuit 16 examines whether the inhibition status is manually canceled through the maintenance terminal 700 or not (step S81), whether the restoration timer times out or not (step S82), whether restoration of the monitoring control light at the downstream-side station 1B (1A) is detected or not (step S83), and whether or not detection is made on light down of the monitoring control light from the downstream-side station 1B (1A) and reflected light amount falling edge (transition from reflected light amount large to reflected light amount small) at the self station 1A (1B) (step S84).

If the examination reveals that no detection is made on any of the above cases, then the control circuit 16 continues count-up of the timer count of the restoration timer until any one of the above events is detected (i.e., Yes-determination is made at any of the steps S81 to S84). This processing corresponds to that of No-route at steps S81 to S84 and step S85. In this way, the control circuit 16 measures the time passage of actual open state (real time) of the output port. If any one of the above events is detected (Yes-route is selected at any one of the steps S81 to S84), the control circuit 16 automatically cancels the inhibition status (step S91) and the processing goes to the ordinary management mode (APSD control activated status).

Meanwhile, if the transmission path fiber disconnection is brought about upon the inhibition status setting or soon after the same, i.e., down of the monitoring control light at the downstream-side station 1B (1A) is detected at step S73 or detection is made on down of the monitoring control light from the downstream-side station 1B (1A) and reflected light at a point under measurement (output port) by the output reflected light monitoring circuit 28S at step S74, then the control circuit 16 examines whether the inhibition status is manually canceled through the maintenance terminal 700 or not (step S86), whether the restoration timer times out or not (step S87), or whether transmission path fiber 200 (300) is reconnected to the output port or not [i.e., restoration of monitoring control light at the downstream-side station 1B (1A) is detected or not (step S88), or whether or not detection is made on down of the monitoring control light from the downstream-side station 1B (1A) or the reflected light amount falling edge (transition from reflected light amount large to reflected light amount small) at the self station 1A (1B) (step S78)].

If the examination reveals that no detection is made on any of the above cases, then the control circuit 16 continues count-up of the timer count of the restoration timer (step S90) until any one of the above events is detected (i.e., Yes-determination is made at any of the steps S86 to S89). In this way, the control circuit 16 measures the time passage from a timing point when the inhibition status is set (i.e., real time from a timing point when the transmission path fiber disconnection is brought about). If any one of the above events is detected (Yes-route is selected at any one of the steps S86 to S89), the control circuit 16 automatically cancels the inhibition status (step S91) and the processing goes to the ordinary management mode (APSD control activated status).

As described above, according to the present modified example, management is made by the restoration timer on the real time passage counted from the timing point when the transmission path fiber disconnection is actually brought about. Therefore, it becomes possible to avoid such an inefficient incident that, after the inhibition status is set to the station, the optical output power measurement work is started late and time-out is brought about during the measurement work, and as a consequence the APSD control activated status is brought about, making it incapable of measuring the optical output power. Further, if the restoration timer times out, then the APSD control will be automatically activated, and even if the transmission path fiber 200 (300) is reconnected to the station before the restoration timer times out, the APSD control will be automatically activated. Therefore, even if the transmission path fiber 200 (300) is unintentionally pulled out from the station, the optical output at a high power can be prevented from being released inadvertently and security will be improved.

It is needless to say that the present invention will not be limited the above-described embodiments but various changes and modifications could be effected without departing from the gist of the present invention.

As described above, according to the present invention, if the automatic optical output control is brought into inhibition status and thereafter the optical transmission path (transmission path fiber) is reconnected, the automatic optical output control inhibition status is automatically canceled. Therefore, the optical output at the high power can be prevented from being released inadvertently and remarkably improved security environment can be provided for the worker such as the maintenance engineer. Accordingly, it is expected that the present invention provides great contribution to a field of optical communication technology.

What is claimed is:

1. An optical output control method for use in an optical transmission node (hereinafter called "a first node"), which exchanges light with a different optical transmission node (hereinafter called "a second node"), said first node performing automatic optical output control to decrease or shutdown an optical output therefrom to said second node upon receiving light down detecting information sent from said second node, said automatic optical output control being selectively activated or inhibited, the method comprising the steps of:

detecting an optical path connection established between said first and second nodes while the automatic optical output control is being inhibited and is thereby in inhibition status, wherein the automatic optical output control is set to be inhibited for a predetermined period of time; and canceling the inhibition status of the automatic optical output control prior to the end of said predetermined period of time, upon detection of re-establishment of said optical path connection within said predetermined period of time.

2. An optical output control method according to claim 1, wherein said cancellation of the inhibition status is made in response to detection of said optical path connection by receiving light down restoration information sent from said second node.

3. An optical output control method according to claim 2, wherein said light includes main signal light and monitoring control light.

4. An optical output control method according to claim 3, wherein said cancellation of the inhibition status is made in response to reception of said light down restoration information, of said monitoring control light, sent from said second node.

5. An optical output control method according to claim 3, wherein said cancellation of the inhibition status is made in response to reception of said light down restoration information, of said main signal light, sent from said second node.

6. An optical output control method according to claim 5, wherein when said automatic optical output control is brought into said inhibition status, said monitoring control light to be sent to said second node is placed under a shutdown control.

7. An optical output control method according to claim 2, wherein said inhibition status is cancelled not only when said first node receives an instruction to cancel the inhibition status but also when a predetermined period of time elapses from a timing point when said automatic optical output control is brought into the inhibition status.

8. An optical output control method according to claim 1, wherein said light includes main signal light and monitoring control light.

9. An optical output control method according to claim 8, wherein said first node monitors the reflected light amount of an optical output which is reflected from an output port of said first node, and examines decrease in said reflected light amount for detecting said optical path connection to said second node, and said inhibition status is canceled when said optical path connection is detected.

10. An optical output control method according to claim 9, wherein said monitoring of the reflected light amount is made on said monitoring control light reflected from said output port.

11. An optical output control method according to claim 9, wherein said monitoring of the reflected light amount is made on said main signal light reflected from said output port.

12. An optical output control method according to claim 11, wherein when said automatic optical output control is brought into the inhibition status, said monitoring control light to be sent to said second node is canceled to shut down.

13. An optical output control method according to claim 8, wherein after said automatic optical output control is brought into the inhibition status, a preparatory alarm counter is activated upon receiving optical path cut detecting information, of said monitoring control light, sent from said second node, and an alarm message is generated when a predetermined period of time is counted by said preparatory alarm counter.

14. An optical output control method according to claim 8, said first node monitoring reflected light amount of an optical output which is reflected from an output port of said first node, wherein if optical path cut is recognized in the path of said monitoring control light to be sent from said second node and no variation is detected in said reflected light amount, then a preparatory alarm counter is activated upon bringing said automatic optical output control into the inhibition status, and an alarm message is generated when a predetermined period of time is counted by said counter.

15. An optical output control method according to claim 1, wherein said first node monitors the reflected light amount of an optical output which is reflected from an output port of said first node, and examines decrease in said reflected light amount for detecting said optical path connection to said second node, and said inhibition status is canceled when said optical path connection is detected.

16. An optical output control method according to claim 15, wherein said inhibition status is canceled not only when said first node receives an instruction to cancel the inhibition status but also when a predetermined period of time elapses from a timing point when said automatic optical output control is brought into the inhibition status.

17. An optical output control method according to claim 1, wherein said inhibition status is canceled not only when said first node receives an instruction to cancel inhibition status but also when a predetermined period of time elapses from a timing point when said automatic optical output control is brought into the inhibition status.

18. An optical output control method according to claim 1, wherein after said automatic optical output control is brought into the inhibition status, said first node reflected light amount of an optical output which is reflected from an output port of said first node, and a preparatory alarm counter is activated upon detecting the increase of said reflected light amount, and an alarm message is generated when a predetermined period of time is counted by said preparatory alarm counter.

19. An optical output control apparatus for use in an optical transmission node (hereinafter called "a first node"), which exchanges light with a different optical transmission node (hereinafter called "a second node"), said first node selectively performing automatic optical output control to decrease or shutdown an optical output therefrom to said second node upon receiving light down detecting information sent from said second node, whereby said automatic optical output control being selectively activated or inhibited, said optical output control apparatus comprising:

optical path conduction detecting means for detecting the optical path conduction established between said first and second nodes while the automatic optical output control is being inhibited and is thereby in inhibition status, wherein the automatic optical output control is set to be inhibited for a predetermined period of time; and control means for canceling the inhibition status of the automatic optical output control prior to the end of said predetermined period of time, upon detection of re-establishment of the optical path conduction at said optical path conduction detecting means within said predetermined period of time.

20. An optical output control apparatus according to claim 19, wherein
said optical path conduction detecting means comprises a light down restoration information detecting unit for detecting light down restoration information sent from said second node, and
said control means comprises an optical path cut restoration trigger canceling unit for canceling said inhibition status when said light down restoration information detecting unit detects said light down restoration information.

21. An optical output control apparatus according to claim 20, wherein said light includes main signal light and monitoring control light.

22. An optical output control apparatus according to claim 21, wherein
said light down restoration information detecting unit is arranged as a monitoring control light restoration information detecting unit for detecting light down restoration information, of said monitoring control light, sent from said second node.

23. An optical output control apparatus according to claim 21, wherein
said light down restoration information detecting unit is arranged as a main signal light restoration information detecting unit for detecting light down restoration information, of said main signal light, sent from said second node.

24. An optical output control apparatus according to claim 23, wherein
said control means comprises a monitoring control light shut-down control unit for bringing said monitoring control light under a shut-down control when said automatic optical output control is brought into the inhibition status.

25. An optical output control apparatus according to claim 20, said control means further comprising:
a canceling instruction detecting unit for detecting a canceling instruction to cancel the inhibition status; and
a restoration timer for counting a predetermined period of time starting from a timing point when said automatic optical output control is brought into said inhibition status, wherein
said inhibition status is canceled not only when said canceling instruction is detected by said canceling instruction detecting unit but also when said predetermined period of time is counted by said restoration timer.

26. An optical output control apparatus according to claim 19, wherein said light includes main signal light and monitoring control light.

27. An optical output control apparatus according to claim 26, wherein
said optical path conduction detecting means comprises a reflected light monitoring unit for monitoring reflected light amount of an optical output which is reflected from an output port of said first node, and
said control means comprises a reflected light amount variation trigger canceling unit for canceling said inhibited status when said reflected light monitoring unit detects decrease of said reflected light amount.

28. An optical output control apparatus according to claim 27, wherein
said reflected light monitoring unit is arranged as a monitoring control light reflected amount monitoring unit for monitoring reflected light amount of said monitoring control light which is reflected from said output port.

29. An optical output control apparatus according to claim 27, wherein
said reflected light monitoring unit is arranged as a main signal light reflected amount monitoring unit for monitoring reflected light amount of said main signal light which is reflected from said output port.

30. An optical output control apparatus according to claim 29, wherein
said control means comprises a monitoring control light shut-down control unit for controlling said monitoring control light to be shutdown when said automatic optical output control is brought into the inhibition status.

31. An optical output control apparatus according to claim 27, further comprising a monitoring control light down detecting unit for detecting light down of monitoring control light sent from said second node,
said control means comprising:
a preparatory alarm counter starting time counting upon bringing said automatic optical output control into the inhibition status under condition that said monitoring control light optical path cut detecting unit detects light down of said monitoring control light and said reflected light monitoring unit detects no variation in said reflected light amount; and
an alarm generating unit for generating an alarm when a predetermined period of time is counted by said preparatory alarm counter.

32. An optical output control apparatus according to claim 26, said control means further comprising:
a preparatory alarm counter for starting time counting in response to the detection of increase in said reflected light amount at said reflected light monitoring unit after the automatic optical output control is brought into the inhibited status; and
an alarm generating unit for generating an alarm when a predetermined period of time is counted by said preparatory alarm counter.

33. An optical output control apparatus according to claim 19, wherein
said optical path conduction detecting means comprises a reflected light monitoring unit for monitoring reflected light amount of an optical output which is reflected from an output port of said first node, and
said control means comprises a reflected light amount variation trigger canceling unit for canceling said inhibition status when said reflected light monitoring unit detects decrease of said reflected light amount.

34. An optical output control apparatus according to claim 33, said control means further comprising:
a canceling instruction detecting unit for detecting a canceling instruction to cancel said inhibition status; and
a restoration timer for counting a predetermined period of time starting from a timing point when said automatic optical output control is brought into said inhibition status, wherein
said inhibition status is canceled not only when said canceling instruction is detected by said canceling instruction detecting unit but also when said predetermined period of time is counted by said restoration timer.

35. An optical output control apparatus according to claim 33, said control means further comprising:
a preparatory alarm counter for starting time counting in response to the detection of increase in said reflected light amount at said reflected light monitoring unit after the automatic optical output control is brought into the inhibition status; and an alarm generating unit for generating an alarm when a predetermined period of time is counted by said preparatory alarm counter.

36. An optical output control apparatus according to claim 19, said control means further comprising:

a canceling instruction detecting unit for detecting a canceling instruction to cancel the inhibition status; and a restoration timer for counting a predetermined period of time starting from a timing point when said automatic optical output control is brought into said inhibition status, wherein said inhibition status is canceled not only when said canceling instruction is detected by said canceling instruction detecting unit but also when said predetermined period of time is counted by said restoration timer.

37. A method comprising:

performing automatic optical output control by a first node of an optical transmission system to decrease or shutdown optical output from the first node to a disconnected first transmission path fiber that, when connected, connects the first node to a second node of the optical transmission system, wherein the automatic optical output control is set to be performed for a predetermined period of time; and canceling the automatic optical output control upon information sent to the first node by the second node during said predetermined period of time over a second transmission path fiber connecting the first node to the second node, wherein the information sent to the first node indicates that the second node received a control light from the first node over the first transmission path fiber indicating that the first transmission path fiber has been reconnected, so that the automatic optical output control is thereby canceled prior to the end of said predetermined period of time.

38. An apparatus comprising:

means for performing automatic optical output control by a first node of an optical transmission system to decrease or shutdown optical output from the first node to a disconnected first transmission path fiber that, when connected, connects the first node to a second node of the optical transmission system, wherein the automatic optical output control is set to be performed for a predetermined period of time; and means for canceling the automatic optical output control upon information sent to the first node by the second node during said predetermined period of time over a second transmission path fiber connecting the first node to the second node, wherein the information sent to the first node indicates that the second node received a control light from the first node over the first transmission path fiber indicating that the first transmission path fiber has been reconnected, so that the automatic optical output control is thereby canceled prior to the end of said predetermined period of time.

\* \* \* \* \*

UNITED STATES PATENT AND TRADEMARK OFFICE
CERTIFICATE OF CORRECTION

PATENT NO.         : 7,519,300 B2                                           Page 1 of 1
APPLICATION NO. : 10/861568
DATED                 : April 14, 2009
INVENTOR(S)       : Toshihiro Ohtani et al.

It is certified that error appears in the above-identified patent and that said Letters Patent is hereby corrected as shown below:

Title Page, Column 2 (Foreign Patent Documents), Line 10, change "20023-8518" to --2003-8518--.

Signed and Sealed this

Thirteenth Day of October, 2009

David J. Kappos
*Director of the United States Patent and Trademark Office*